US012747952B1

(12) United States Patent
Kurtyka et al.

(10) Patent No.: US 12,747,952 B1
(45) Date of Patent: Sep. 29, 2026

(54) PASSENGER NOTIFICATION BASED ON VEHICLE PERCEPTION DATA

(71) Applicant: Zoox, Inc., Foster City, CA (US)

(72) Inventors: Casey Evan Kurtyka, San Francisco, CA (US); Colin Lee Madere, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 362 days.

(21) Appl. No.: 18/129,591

(22) Filed: Mar. 31, 2023

(51) Int. Cl.

| | |
|---|---|
| ***G01C 21/34*** | (2006.01) |
| ***B60Q 1/50*** | (2006.01) |
| ***B60Q 5/00*** | (2006.01) |
| ***G01C 21/16*** | (2006.01) |

(52) U.S. Cl.
CPC ......... *G01C 21/3407* (2013.01); *B60Q 1/507* (2022.05); *B60Q 5/005* (2013.01); *G01C 21/1656* (2020.08)

(58) Field of Classification Search
CPC ............ G01C 21/3407; G01C 21/1656; B60Q 1/507; B60Q 5/005
See application file for complete search history.

(56) References Cited

U.S. PATENT DOCUMENTS

| | | | | |
|---|---|---|---|---|
| 9,412,274 | B2 * | 8/2016 | Lickfelt | G08B 3/10 |
| 9,878,664 | B2 | 1/2018 | Kentley-Klay et al. | |
| 10,649,459 | B2 | 5/2020 | Wang et al. | |
| 10,809,081 | B1 * | 10/2020 | Kentley-Klay | G08G 1/202 |
| 11,104,269 | B2 | 8/2021 | Karol | |
| 2017/0140631 | A1 * | 5/2017 | Pietrocola | G01J 1/4204 |
| 2017/0344010 | A1 * | 11/2017 | Rander | G06Q 10/08 |
| 2018/0061251 | A1 * | 3/2018 | Venkatraman | G01C 21/20 |
| 2019/0235515 | A1 * | 8/2019 | Shirvani | B60W 60/0015 |
| 2020/0021958 | A1 * | 1/2020 | Nemec | G06Q 50/43 |
| 2020/0160709 | A1 * | 5/2020 | Ramot | G06Q 10/047 |
| 2021/0097873 | A1 * | 4/2021 | Sassinsky | G08G 5/53 |

(Continued)

FOREIGN PATENT DOCUMENTS

| | | | | |
|---|---|---|---|---|
| CN | 109564674 A | * 4/2019 | | G01C 21/3438 |
| DE | 102013217430 A1 | * 3/2014 | | B60T 7/22 |
| JP | 2012247326 A | * 12/2012 | | |

OTHER PUBLICATIONS

JP-2012247326-A EPO Translation of Description with paragraph numbers (Year: 2012).*

(Continued)

*Primary Examiner* — Rachid Bendidi
(74) *Attorney, Agent, or Firm* — Lee & Hayes, P.C.

(57) ABSTRACT

Techniques for notifying candidate passengers of potential hazards are discussed herein. A vehicle may navigate to a location within an environment to pick up a passenger for transportation. Upon arriving at the pickup location, the vehicle may determine whether the passenger is located at the pickup location. Based on the passenger not being located at the pickup location, the vehicle may capture sensor data from one or more sensor devices on the vehicle. The vehicle may analyze the sensor data to identify potential hazard(s) proximate the pickup location. Based on identifying potential hazard(s), the vehicle may determine a recommended path for the passenger to follow from their current location to the vehicle. The vehicle may transmit a message that includes the potential hazard(s) and/or the recommended path to a user device of the passenger.

20 Claims, 12 Drawing Sheets

(56) References Cited

U.S. PATENT DOCUMENTS

| | | | | |
|---|---|---|---|---|
| 2022/0107646 | A1* | 4/2022 | Blake | G06V 20/58 |
| 2022/0139227 | A1* | 5/2022 | Gao | G08G 1/202<br>455/456.2 |
| 2022/0221296 | A1* | 7/2022 | Correia Duarte Furtado | G01C 21/3629 |
| 2022/0221867 | A1* | 7/2022 | Taveira | G05D 1/617 |
| 2023/0058007 | A1* | 2/2023 | Somanath | B60W 60/00253 |

OTHER PUBLICATIONS

JP2012247326 EPO translation with paragraph numbers (Year: 2012).*
CN109564674B EPO Translation (Year: 2016).*
DE102013217430A1 EPO Translation (Year: 2014).*
Morgan, M. G., Florig, H. K., deKay, M. L., & Fischbeck, P. (2000). “Categorizing Risks for Risk Ranking. Risk Analysis”, An International Journal, 20(1), 49-58. https://doi.org/10.1111/0272-4332.00005 (Year: 2000).*
U.S. Appl. No. 17/320,678, Ulutan, et al., filed May 14, 2021, titled “Pedestrian Attribute and Gesture Detection”, 42 pages.

* cited by examiner

300

400

PASSENGER NOTIFICATION BASED ON VEHICLE PERCEPTION DATA

BACKGROUND

Vehicles, such as autonomous vehicles, can operate as passenger taxi vehicles. For example, when a control system receives a request from a user device to pick up a passenger at a location and provide transport to a destination location, the autonomous vehicle may receive, from the control system, instructions to navigate from the pickup location to the destination location. In some circumstances, the autonomous vehicle may be required to park in order to pick up the passenger at the pickup location. In some instances, such as when the passenger is not located at the pickup location (e.g., waiting in a building, walking to the pickup location, etc.), a passenger may encounter hazards and risks while walking to the vehicle. However, in many cases, techniques for helping the passenger safely navigate to the vehicle may be suboptimal and/or insufficient.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
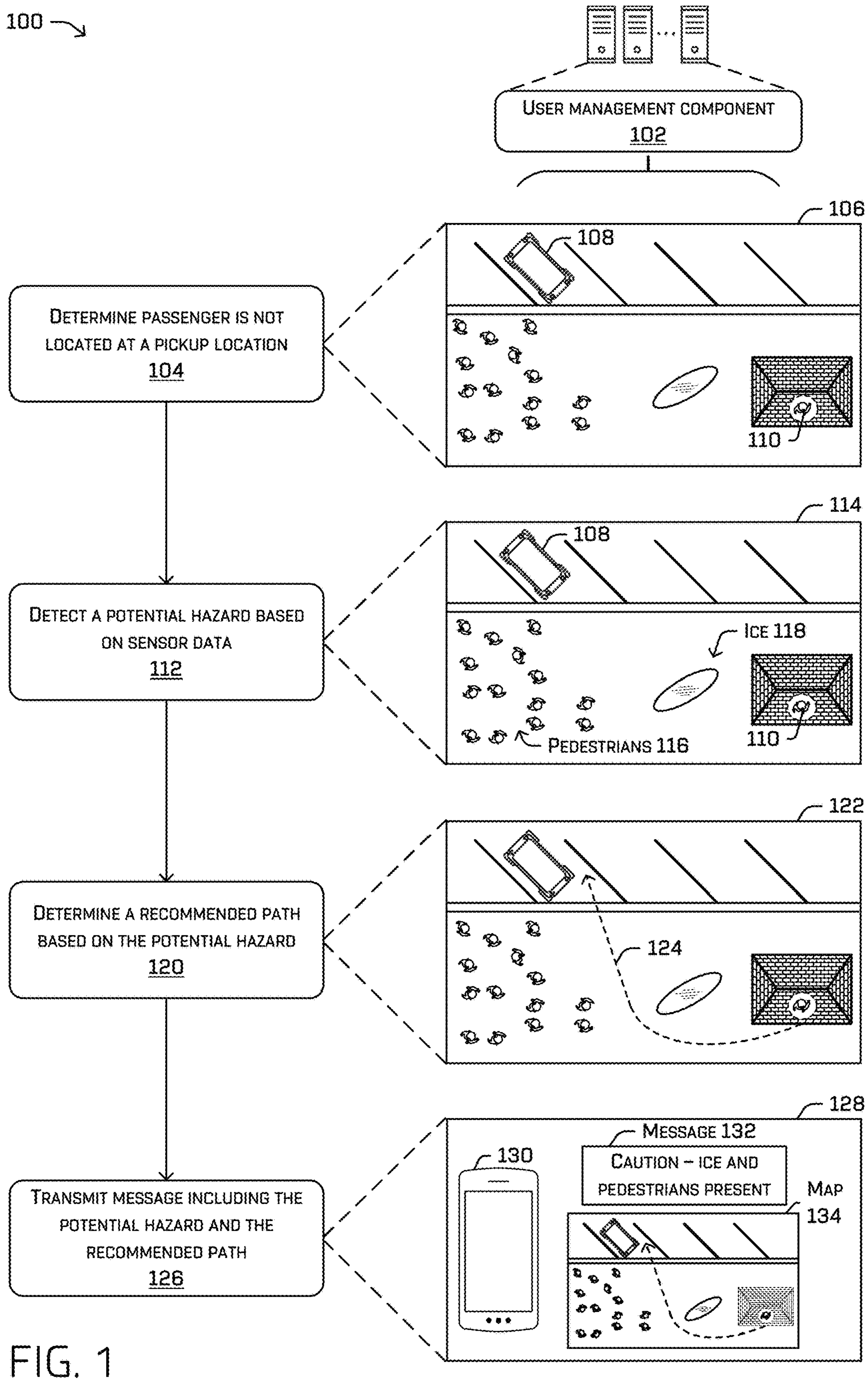
FIG. 1 is a pictorial flow diagram illustrating an example technique for identifying a potential hazard proximate a pickup location, determining a recommended path based on the potential hazard, and transmitting a message that includes the potential hazard and/or the recommended path to a passenger, in accordance with one or more examples of the disclosure.

As discussed above, conventional techniques for helping a passenger safely navigate through a pickup location to a vehicle may be suboptimal and/or insufficient.

Techniques for notifying candidate passengers of potential hazards are discussed herein. As described herein, a vehicle may use its perception system to detect and/or classify potential hazards proximate a pickup location. In some examples, a vehicle (such as an autonomous vehicle) may navigate to a location within an environment to pick up a passenger for transportation. Upon arriving at the pickup location, the vehicle may determine whether the passenger is located at the pickup location. Based on the passenger not being located at the pickup location, the vehicle may capture sensor data from one or more sensor devices (e.g., lidar device, image capturing device, radar device, time-of-flight device, etc.) on the vehicle. The vehicle may analyze the sensor data to identify one or more potential hazards (e.g., ice, potholes, intervening bicycle lane, etc.) proximate the pickup location and/or the vehicle. Based on identifying potential hazard(s), the vehicle may determine a recommended path for the passenger to follow from their current location to the vehicle. The recommended path may instruct the passenger to follow a route to the vehicle that avoids or otherwise mitigates interaction with the potential hazard(s). The vehicle may transmit a message that includes the potential hazard(s) and/or the recommended path to a user device of the passenger. In such instances, the user device may cause the message to be displayed on a user interface of the user device. As discussed throughout this disclosure, the techniques described herein may improve passenger safety and/or the process of helping a passenger safely navigate through a pickup location to the vehicle.

When helping a passenger navigate through a pickup area, conventional techniques may result in suboptimal or insufficient results. For example, a vehicle may receive a request to transport a passenger from a starting location to a destination location. In some examples, the passenger may not be present at the pickup location when the vehicle arrives. For instance, the passenger may be in a store, waiting in a separate vehicle, walking to the pickup location, etc. In such instances, the passenger may be unaware of potential hazards within the region proximate the vehicle and/or pickup location. Based on conventional vehicle systems, the vehicle may be unable to detect such potential hazards, and thus unable to inform the passenger to use caution when approaching the vehicle. Further, even if a passenger was aware of the potential hazards, the conventional vehicle systems may be unable to help the passenger identify a safe route to the vehicle based on locations of the potential hazards. Accordingly, passengers may have to navigate to the vehicle based on their own perspective and/or judgement. Consequently, the limitations to conventional techniques may result in passengers navigating the pickup region with limited (or without any) assistance from the vehicle, thereby increasing the likelihood passengers encounter one or more potential hazards.

To address these and other technical problems and inefficiencies, the systems and/or techniques described herein include a user management system (which also may be referred to as a "user management component" or a "user manager") configured to notify passengers of potential hazards within a pickup region. Further, the user management component may be configured to transmit messages to passengers based on leveraging the vehicles perception system and/or sensor system. Technical solutions discussed herein solve one or more technical problems associated with a vehicle's limited ability to help passengers navigate through a pickup region to a vehicle.

Initially, a user management component may receive a request and/or instructions to navigate to a location within an environment. The request may include transporting pedestrians, customers, and/or passengers between pickup and drop off locations. The user management component may receive the request from an application (e.g., a ride sharing application) operating on a user device (e.g., mobile phone, tablet, computer, etc.) of a passenger. Upon receiving the request, user management component or any other component of the vehicle may instruct the vehicle to navigate to the pickup location.

In some examples, the user management component may determine whether the passenger is located at the pickup location. In some instances, passengers that are not located at the pickup location may be unable to perceive the potential hazards that they may experience as such passengers navigate from their current location to the pickup location (e.g., where the vehicle is positioned). As such, upon determining the passenger is not located at the pickup location, the user management component may determine whether there are potential hazards proximate the pickup location and/or notify the passenger of such potential hazards.

In some examples, the user management component may determine that the passenger is not located at the pickup location. A pickup location may be a location in the environment where the vehicle is requested to pick up a passenger for transportation. As the vehicle may be unable to navigate to the exact requested pickup location, a pickup location may also be a location where the vehicle is located (e.g., parked) to pick up the passenger. In some examples, a region proximate the pickup location may include an area around the parking location which may have varying sizes and/or shapes based on the environment. The user management component may determine whether the passenger is within the region and/or at the pickup location based on user device data and/or sensor data captured from sensors of the vehicle. For instance, in examples in which users have opted in or granted permission to share their locations, the user management component may use user location data obtained from geolocating users that are using the mobile application. If the location data indicates that the user is outside of the region and/or beyond a threshold distance from the vehicle, the user management component may determine that the passenger is not located at the pickup location and/or within a region proximate the pickup location. Additionally or alternatively, the user management component may capture and/or evaluate sensor data from one or more sensor modalities to determine and/or confirm the determination made by geolocating the user device. Alternatively or additionally, when determining whether a passenger is able to perceive potential hazards proximate a pickup location, the user management component may determine whether a location of the passenger satisfies a threshold condition. In such instances, the threshold conditions may include any one of a distance between the location of the passenger and the vehicle meeting or exceeding a threshold distance, a distance between the potential hazard and a recommended path being below a threshold distance, a line-of-sight present between the passenger and the pickup location or the vehicle, the location of the passenger being within an occluded region, and/or any other condition.

Based on the passenger not being located at the pickup location (or satisfying a threshold condition), the user management component may determine whether there are potential hazards within the region proximate the pickup location. In such instances, the user management component may receive sensor data representing the region proximate the pickup location. The user management component may receive the sensor data from one or more sensor devices mounted or installed at different locations on the vehicle and/or a same sensor device at different times. The sensor devices may include one or more lidar devices, one or more image capturing devices, one or more radar devices, one or more time-of-flight devices, and/or any other type of sensor device. In some examples, the sensor devices may be configured to capture sensor data while the vehicle is at and/or proximate the pickup location.

In some examples, the user management component may determine or otherwise detect one or more potential hazards based on the sensor data. A potential hazard may include an occluded region proximate the pickup location, a region of the ground having ice, a region of the ground having snow, a region of the ground having water, poor weather conditions (e.g., rain, hail, snow, wind, etc.), elevated traffic levels (e.g., vehicles, bicycles, etc.) proximate the pickup location, elevated pedestrian activity proximate the pickup location, the presence of animals and/or the presence of certain types of animals proximate the pickup location (e.g., within a threshold distance), an intervening bicycle lane, an object predicted to enter the pickup location, a sound of an emergency vehicle, a region of the ground having a pothole, a pedestrian smoking, and/or any other circumstance. In some examples, the user management component may have a comprehensive list of potential hazards. In such examples, the user management component may determine whether any of the potential hazards in the list of potential hazards are present within a region of the pickup location. Alternatively or additionally, the user management component may access a user profile (e.g., for the application) of the passenger to identify potential hazards that the user has identified as important and/or relevant to the passenger. In such instances, the user manager may determine whether any of the important and/or relevant potential hazards are located within a region proximate to the pickup location.

In some examples, the user management component may use one or more machine learning models trained to detect one or more types of potential hazards. In some examples, the user management component may have one or more machine learning models configured to perform such functions. The machine learning models can be trained to output an identification of a potential hazard. For example, a combination of sensor data (from any number of sensor modalities), map data, historical data, and/or user preferences may be inputted into the trained machine learning model of the user management component. Further, the machine learning models may be configured to output identifications of one or more types of potential hazards. As such, the user management component may utilize the one or more machine learning models to obtain a list of potential hazards present within a region proximate the pickup location.

In some examples, the user management component may determine or otherwise generate a recommended path for the passenger to follow to the vehicle based on the list of potential hazards. A recommended path may be a route through the region that limits or otherwise mitigates the passenger's exposure and/or interaction with the list potential hazards. The user management component may determine the recommended path starting from the passenger's current location (e.g., obtained from the user device location data) and leading to the vehicle as the destination location. When determining the recommended path, the user management component may weigh one or more factors, such as which potential hazards are important and/or relevant to the passenger, locations of such potential hazards, seating preference of the passenger (e.g., prefer sitting facing the direction of travel, prefer sitting facing opposite the direction of travel, etc.), passengers currently inside the vehicle, locations of passengers inside the vehicle, future passengers to pick up and/or such future passenger preferences, passenger characteristics (e.g., blind, deaf, etc.), current passenger transportation (e.g., passenger is walking, passenger is cycling, etc.), ranking of the relevant potential hazards, and/or any other factors. In some examples, the user management component may determine the recommended path based on weighing the aforementioned factors.

In some examples, the user management component may determine a ranking and/or hierarchy of potential hazards based on the user profile and/or user preferences. The rank and/or hierarchy of potential hazards indicate a prioritization and/or importance of the potential hazard with respect to the individual passenger. For example, a potential hazard with a high rank (or high in the hierarchy) may indicate that such a potential hazard is important and/or takes precedence (or overrides) lower ranked potential hazards when determining the recommended path. For instance, the user management component may determine a recommended path that causes the passenger to have a minor interaction with a lower ranked potential hazard to ensure that the passenger does not encounter or interact with higher ranked potential hazards.

In some examples, the user management component may rank the potential hazards based on one or more factors. For instance, such factors may include a likelihood that encountering the potential hazard may result in physical harm, the degree of physical harm caused by the encountering the potential hazard (e.g., based on the nature of the potential hazard and/or the characteristics of the passenger), whether the passenger has disabilities, a type of disability of the passenger (e.g., deaf, blind, wheelchair bound, etc.), user input via the application (e.g., the passenger may indicate certain potential hazards as ranked higher than others), and/or any other factor. As such, in some examples, when determining a recommended path for a passenger with disabilities that is confined to a wheelchair, the user management component may rank certain potential hazards higher (e.g., stairs, steep sidewalk angles, etc.) than others (e.g., wind, ice, groups of people, etc.) based on the likelihood of physical injury and/or the passengers' disabilities. In other examples, when determining a recommended path for a passenger that is deaf, the user management component may rank potential hazards higher than others. For instance, the user management component may determine that potential hazards which require processing sound as a higher ranked potential hazard than a potential hazard that does not require hearing. In some cases, one or more weights may be used in addition to or instead of ranks of hierarchy.

In some examples, the user management component may transmit a message that includes the potential hazard(s) and/or the recommended path to the passenger. The user management component may transmit the message to the passenger via the application on the user device. The message may include at least a portion of the potential hazards identified within the region proximate the pickup location. For instance, in situations in which the region has more than a threshold number of potential hazards, the user management component may select or otherwise determine a number of the highest ranked (e.g., above a threshold number) potential hazards to send to the user device of the passenger. The user management component may also transmit the recommended path to the user device of the passenger. The recommended path may be sent and/or displayed to the user device in various formats, such as by illustrating the recommended path with respect to a map of the region, describing the path through written text, and/or any other format.

In some examples, the passenger may receive the message via the user device. The user device may display the message via a user interface of the user device. In such instances, the passenger may interact with the vehicle via the application by transmitting messages to the vehicle. The passenger may confirm a message sent from vehicle, request the vehicle change locations, cancel the ride based on the potential hazards, and/or any other action.

Alternatively or additionally, the user management component may transmit one or more messages to the user device of the passenger enabling the passenger to indicate if the vehicle should change parking and/or pickup locations. In some instances, the user management component may determine that based on the locations and/or ranks of the potential hazards as well as observed changes within the region that it may be advantageous to change pickup locations. For instance, the user management component may determine that better parking has become available and/or that the vehicle is proximate one or more potential hazards. In such instances, the user management component may transmit a message to the passenger asking if the passenger would like the vehicle to relocate based on the various factors. Upon receiving confirmation from the passenger, the user management component or any other component of the vehicle may instruct the vehicle to change pickup locations. In such instances, the user management component may perform the operations described above at the new pickup location (e.g., identify potential hazards, determine path, etc.).

Though the passenger notification techniques are described with respect to passenger pickup, such techniques may equally apply to passenger drop off.

As illustrated by these examples, the techniques described herein can improve systems and processes of the autonomous and semi-autonomous vehicles operating in various driving environments. The use of vehicle sensor and perception systems may allow a vehicle to more efficiently identify or otherwise notify soon-to-be passengers of the potential hazards that are proximate a pickup location. Notifying such passengers of the potential hazards proximate the vehicle and/or pickup location may improve passenger safety while such passengers navigate to the vehicle.

The techniques described herein can be implemented in a number of ways. Example implementations are provided below with reference to the following figures. Example implementations are discussed below in which the delivery vehicles are implemented as autonomous vehicles. However, the methods, apparatuses, and systems described herein can be applied to fully or partially autonomous delivery vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in an aviation or nautical contexts. Additionally, the techniques described herein may be used with real data (e.g., captured using sensor(s)), simulated data (e.g., generated by a simulator), or any combination of the two.

FIG. 1 is a pictorial flow diagram illustrating an example process 100 for detecting a potential hazard within a pickup region, determining a recommended path for a passenger to follow based on the potential hazard, and transmitting the potential hazard and/or recommended path to a user device of the passenger. As shown in this example, some or all of the operations in the example process 100 may be performed by a user management component 102 integrated within a perception component, a prediction component, a planning component, and/or other components and systems within an autonomous vehicle. For instance, as shown in this example, example process 100 may be implemented using a user management component 102. As described below in more detail, the user management component 102 may include various components, such as a hazard detection component, a path component, and/or a notification component, which may be configured to determine or otherwise identify potential hazards, determine a path based on the potential hazards, and/or notify a passenger based on such information.

At operation 104, the user management component 102 may determine that a passenger is not located at a pickup location. In some examples, the user management component 102 may receive a request to pick up a passenger from a location in the environment. In such instances, the user management component 102 may cause the vehicle to navigate to the pickup location. Upon arriving at the pickup location, the user management component 102 may determine whether the passenger is present at the pickup location. For example, box 106 illustrates an autonomous vehicle 108 parked at a pickup location. In this example, the pickup location may be a side of the road; however, in other examples the pickup location may be a parking lot, a home, and/or any other location. As shown, the box 106 may also include a passenger 110. In some examples, the user management component 102 may determine whether the passenger 110 is present at the pickup location. As shown, the passenger 110 may be located within a building and/or is beyond a threshold distance from the vehicle 108. Thus, the user management component 102 may determine that the passenger 110 is not located at the pickup location and as such, the passenger 110 may not know of potential hazards proximate the vehicle 108.

At operation 112 the user management component 102 may detect a potential hazard based on sensor data. In some examples, the vehicle 108 may have multiple modalities (e.g., types) of sensor devices mounted at various locations and various angles relative to the vehicle 108 to capture sensor data of the pickup location. In some examples, the user management component 102 may analyze the sensor data captured from some or all sensor modalities to identify one or more potential hazards proximate the pickup location. For example, box 114 illustrates one or more potential hazards proximate the pickup location. In this example, the box 114 may include a first potential hazard 116 and a second potential hazard 118. As shown, the first potential hazard 116 may be a group of pedestrians and the second potential hazard 118 may be a portion of the ground covered by ice. Of course, this example is not intended to be limiting, as in other examples the potential hazards may be an occluded region proximate the pickup location, a region of the ground having snow, a region of the ground having water, poor weather conditions (e.g., rain, hail, snow, wind, etc.), elevated traffic levels proximate the pickup location, the presence of animals and/or the presence of certain types of animals proximate the pickup location, an intervening bicycle lane, an object predicted to enter the pickup location, a sound of an emergency vehicle, a region of the ground having a pothole, a pedestrian smoking, and/or any other circumstance. In some examples, upon detecting the first potential hazard 116 and the second potential hazard 118, the user management component 102 may determine one or more characteristics associated with such potential hazards. Such characteristics may include a location of the potential hazard with reference to a global or local reference frame, a size and/or dimension of the potential hazard, and/or any other characteristic.

In some examples, the user management component 102 may use one or more machine learning models to identify potential hazards proximate the parking location. Additional details for determining potential hazards are described with respect to FIGS. 2 and 3.

At operation 120, the user management component 102 may determine a recommended path based on the potential hazard. A recommended path may be a route through the region that limits or otherwise mitigates the passenger's exposure and/or interaction with the potential hazard(s). For example, box 122 illustrates a recommended path for the passenger 110 to follow to the vehicle 108. In this example, the recommended path 124 may start from the current location of the passenger 110 which, in this case is inside the building. The recommended path 124 may lead the passenger 110 through the region proximate the pickup location to the vehicle 108. As shown, the recommended path 124 may lead the passenger 110 between the first potential hazard 116 (e.g., group of pedestrians) and the second potential hazard 118 (e.g., ice). Further, the user management component 102 may determine that the recommended path 124 may lead the passenger 110 to a specific side of the vehicle 108 based on the first potential hazard 116 being within a threshold distance from the other side of the vehicle 108. Thus, the recommended path 124 mitigates exposure of the passenger 110 to the first or second potential hazards. Additional details for determining the recommended path 124 are described with respect to FIGS. 2, 3, and 5-7.

At operation 126, the user management component 102 may transmit a message that includes the first potential hazard 116, the second potential hazard 118, and/or the recommended path 124 to the passenger. For example, box 128 illustrates a message and a map to be displayed on a user device of the passenger. In this example, the box 128 includes a user device 130 that belongs to the passenger 110. As shown, the user device 130 may be a mobile phone; however, in other examples the user device 130 may be a computer, tablet, and/or any other electronic device. The box 128 also includes a message 132 which includes the language "caution-ice and pedestrians present". As described above, the message may inform the passenger 110 of the potential hazards (e.g., the first and second potential hazards) that they may encounter while navigating to the vehicle 108. In such instances, the message 132 may be displayed on a user interface of the user device 130. In some examples, the box 128 includes a map 134 of the region between the location of the passenger 110 and the vehicle 108. As shown, the map 134 may illustrate to the passenger 110 where the first and second potential hazards are located. Further, the map 134 may show the passenger 110 a route to follow from their current location to the vehicle 108. The route to follow may be the similar or identical to the recommended path 124 shown in box 122. The map 134 may be displayed on the user interface of the user device 130.

Figure 2:
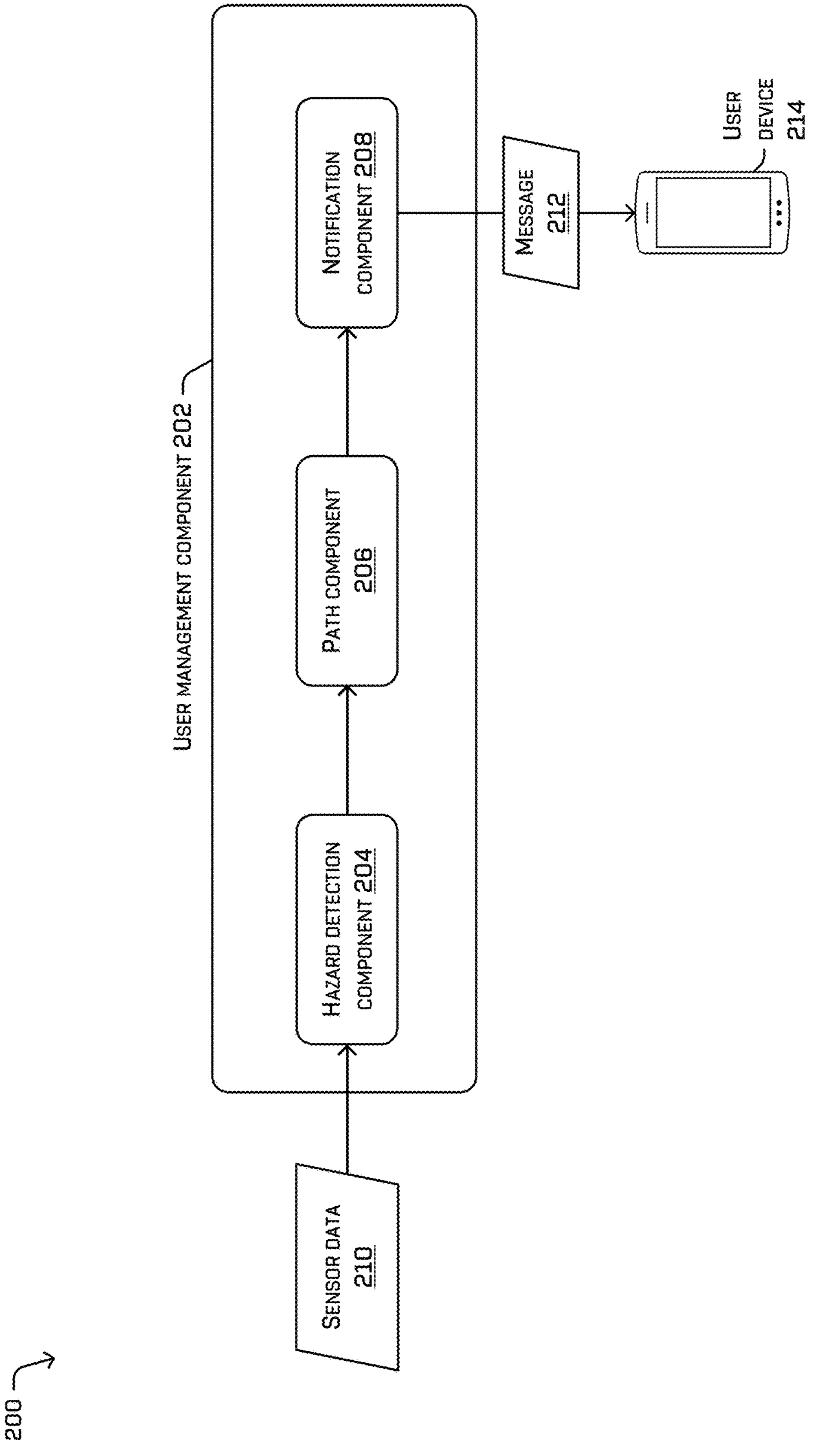
FIG. 2 illustrates an example computing system including a user management component configured to notify passengers of potential hazard(s), in accordance with one or more examples of the disclosure.

FIG. 2 illustrates an example computing system 200 including a user management component 202 configured to transmit potential hazard(s) and/or recommended paths to passengers at pickup locations.

In some examples, the user management component 202 may be similar or identical to the user management component 102 described above, or in any other examples herein. As noted above, in some cases the user management component 202 may be implemented within or otherwise associated with a perception component, a prediction component, and/or a planning component of an autonomous vehicle. In some examples, the user management component 202 may include various components, described below, configured to perform different functionalities of a passenger notification technique. In some examples, some or all of the subcomponents of the user management component 202 may be integrated in on-vehicle systems while other subcomponents may be integrated in a remote server-based system. In some examples, the user management component 202 may include a hazard detection component 204 configured to detect potential hazards, a path component 206 configured to determine a recommended path for the passenger to follow to a vehicle, and/or a notification component 208 configured to determine and otherwise send a message to a user device of the passenger.

In some examples, the user management component 202 may receive sensor data 210 from one or more sensor devices within (or otherwise associated with) an autonomous vehicle. In other examples, the user management component 202 may receive the sensor data 210 from one or more components of the autonomous vehicle. Such components may include a perception component, a prediction component, a planning component, and/or any other component. In some examples, one or more sensor devices may be mounted or installed at different locations on the autonomous vehicle, and may include various types and/or modalities of sensor devices providing various types of sensor data to the user management component 202. Such sensor types and/or modalities may include a lidar device, a radar device, an image capturing device, a time-of-flight device, and infrared device, and/or any other device. In some examples, the sensor data 210 may be sent to the hazard detection component 204 within the user management component 202. Though shown that the hazard detection component 204 receives the sensor data 210, in other examples any other component of the user management component 202 may receive the sensor data 210.

In this example, the user management component 202 may include a hazard detection component 204 configured to determine or otherwise detect potential hazards. The hazard detection component 204 may receive and/or analyze the sensor data 210 to determine whether potential hazards are located proximate the pickup location. As described above, a potential hazard may include an occluded region proximate the pickup location, a region of the ground having ice, a region of the ground having snow, a region of the ground having water, poor weather conditions (e.g., rain, hail, snow, wind, etc.), elevated traffic levels (e.g., vehicles, bicycles, etc.) proximate the pickup location, elevated pedestrian activity proximate the pickup location, the presence of animals and/or the presence of certain types of animals proximate the pickup location (e.g., within a threshold distance), an intervening bicycle lane, an object predicted to enter the pickup location, a sound of an emergency vehicle, a region of the ground having a pothole, a pedestrian smoking, and/or any other circumstance.

In some examples, the hazard detection component 204 may use one or more machine learning models trained to determine whether the abovementioned potential hazards are present based on the sensor data 210. In some examples, the hazard detection component 204 may include one or more machine learning models trained to detect a single type of potential hazard. However, in other examples, the hazard detection component 204 may utilize one or more machine learning models trained to detect any type of potential hazard. In some examples, the hazard detection component 204 may input a combination of sensor data, map data, and/or user preferences into the trained machine learning model. The hazard detection component 204 may receive, as output from the machine learning models, zero or more potential hazards.

In some examples, the user management component 202 may include a path component 206 configured to determine a recommended path for a passenger to follow to the vehicle. The path component 206 may receive a list of one or more potential hazards (e.g., including potential hazard data (e.g., location data, size, dimension, etc.)) from the hazard detection component 204. The path component 206 may utilize the potential hazard data to determine a recommended path for the user to follow to the vehicle. As described above, a recommended path may be a route through the region that limits or otherwise mitigates the passenger's exposure and/or interaction with the potential hazard(s). In some examples, the path component 206 may determine the recommended path starting from the passenger's current location and leading to the vehicle as the destination. The path component 206 may identify the passenger's current location by utilizing the passenger location data obtained from geolocating the passenger using the mobile application, based on the passenger having opted in or granted permission to sharing their locations.

Based on identifying a starting point (e.g., the passenger's current location) for the recommended path, the path component 206 may determine or otherwise generate a path from the starting point to the vehicle. Determining the path may be based on using map data and one or more weighted factors. Such factors may include which potential hazards are important and/or relevant to the passenger, location of the doors of the building within which the passenger is located, locations of such potential hazards, seating preference of the passenger, passengers currently inside the vehicle, locations of passengers inside the vehicle, location and/or state (e.g., open, closed, etc.) of vehicle doors, future passengers to pick up and/or such future passenger preferences, ranking of the relevant potential hazards, and/or any other factors. In some examples, passengers may use a mobile application to provide user input regarding which potential hazards are important and/or relevant to them and/or whether they prefer to sit facing the direction of travel or facing opposite the direction of travel within the vehicle. In other examples, the user may rank and/or provide an indication as to which potential hazards are higher and lower preferences. Additional description regarding providing user input to a mobile device is discussed blow in FIG. 8A.

Additionally or alternatively, the path component 206 may rank the potential hazards based on the user profile and/or user preferences. The ranking may indicate a prioritization and/or importance of the potential hazard with respect to the specific passenger. The path component 206 may rank the detected potential hazards based on various factors, such as a likelihood that encountering the potential hazard may result in physical harm, the degree of physical harm caused by the encountering the potential hazard (e.g., based on the nature of the potential hazard and/or the characteristics of the passenger), whether the passenger has disabilities, a type of disability of the passenger, user input via the application (e.g., the passenger may indicate certain potential hazards as ranked higher than others), historical data (e.g., data of past encounters with the type of potential hazard), and/or any other factor. Accordingly, the path component 206 may utilize such factors to determine a ranking for the potential hazards. In some examples, the path component 206 may determine a recommended path that mitigates and/or avoids interaction with the potential hazards.

In some examples, the user management component 202 may include a notification component 208 configured to determine or otherwise generate a message 212 (e.g., notification) to transmit to the passenger. The notification component 208 may receive the list of one or more potential hazards and/or the recommended path from the path component 206. In some examples, notification component 208 may determine which of the list of one or more potential hazards to send to the user device based on at least one of a rank of the potential hazards, user preference data, and/or any other factor. Upon determining which potential hazard(s) to send to the passenger, the notification component 208 may determine a message to be sent to a user device 214 of the passenger. The message 212 may include the potential hazard(s) and/or the recommended path. In some examples, the potential hazards and/or the recommended path may be displayed via a user interface of the user device.

Figure 3:
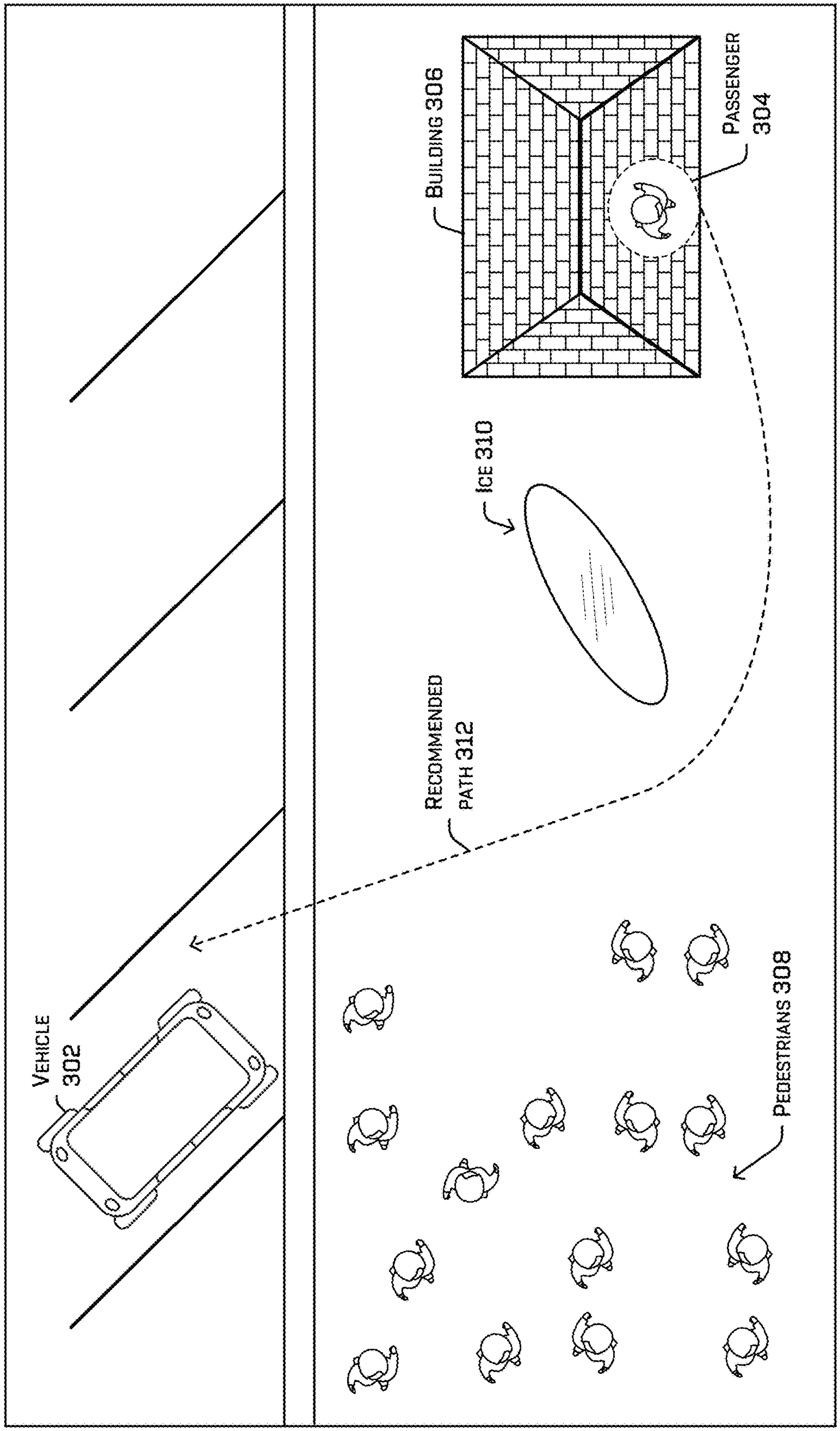
FIG. 3 depicts an example environment including a recommended path that leads a passenger to a vehicle, in accordance with one or more examples of the disclosure.

FIG. 3 depicts an example environment 300 with a recommended path that leads a passenger to a vehicle.

In this example, the example environment 300 may be similar or identical to the environment illustrated and/or described in FIGS. 1 and 2. As shown, the example environment 300 may include a vehicle 302. The vehicle 302 may be parked at a curb-side parking space; however, in other examples the vehicle 302 may park at any type of parking location. In some examples, the vehicle 302 may be located (e.g., parked) at a pickup location where the vehicle 302 may pick up a passenger for transportation. In this example, the example environment 300 may include a passenger 304 that has requested transportation from the vehicle 302. As shown, the passenger 304 may be located within a building 306 and as such, the passenger 304 may be unaware of the activity that is proximate the vehicle 302. However, this example is not intended to be limiting, in other examples the passenger may be behind a building, in a separate vehicle, navigating to the pickup location, etc.

As illustrated in FIG. 3, the example environment 300 may include a first potential hazard 308 and a second potential hazard 310. The first potential hazard 308 may be a group of pedestrians and the second potential hazard 310 may be ice; however, in other examples the first and second potential hazards may be any other type of hazard located at any other position within the environment.

In some examples, the example environment 300 may include a recommended path 312 that leads the passenger 304 from the building 306 to the vehicle 302. As shown, the recommended path 312 is configured such that the passenger 304 does not encounter the first potential hazard 308 or the second potential hazard 310. In such instances, the vehicle 302 may determine the path based on weighing one or more factors, such as which potential hazards are important and/or relevant to the passenger, locations of such potential hazards, seating preference of the passenger (e.g., prefer sitting facing the direction of travel, prefer sitting facing opposite the direction of travel, etc.), passengers currently inside the vehicle, locations of passengers inside the vehicle, future passengers to pick up and/or such future passenger preferences, ranking of the relevant potential hazards, and/or any other factors. In this example, the vehicle can determine that both of the first and second potential hazards are relevant and/or important to the passenger 304. Further, the vehicle can determine that, based on leading the passenger to a particular side of the vehicle, the recommended path 312 can avoid interaction with the potential hazards. As such, the vehicle 302 may determine or otherwise generate the recommended path 312 between the first and second potential hazards and to a side of the vehicle away from the first potential hazard 308.

In some examples, the vehicle may transmit the recommended path 312 to a user device of the passenger 304. In such instances, the user device may render the recommended path 312 to a user interface of the user device.

Figure 4:
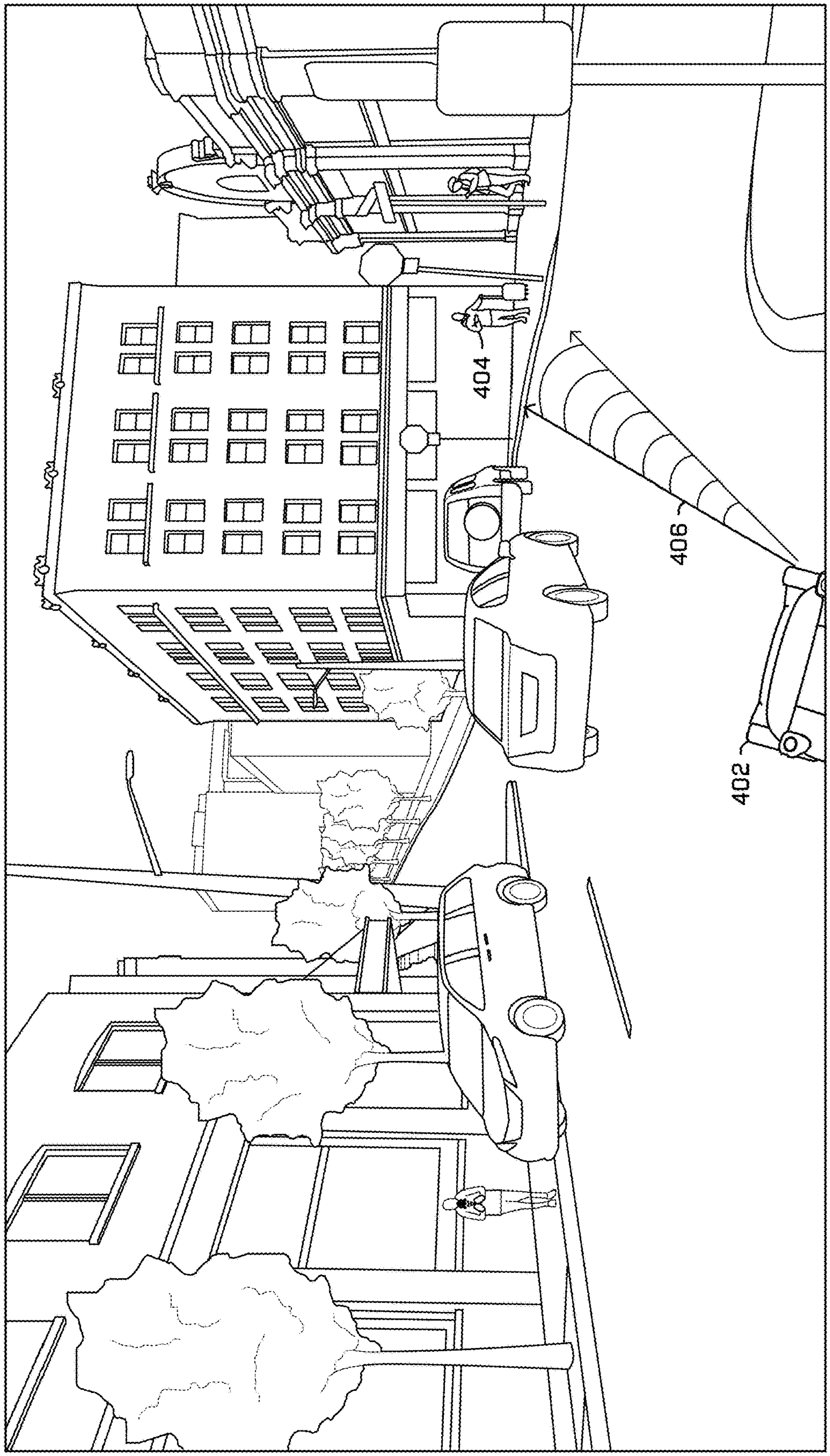
FIG. 4 depicts an example environment in which a vehicle can target a passenger, in accordance with one or more examples of the disclosure.

FIG. 4 depicts an example environment 400 in which a vehicle can target a passenger. Specifically, FIG. 4 describes a vehicle utilizing sound and/or light that is directed towards a passenger.

In some examples, the example environment 400 may include a vehicle 402. The vehicle 402 may be a passenger vehicle configured to transport passengers between pickup and drop off locations. In some examples, the example environment 400 may also include multiple pedestrians at various locations. In this example, the example environment 400 includes a passenger 404 which has requested transportation from the vehicle 402. As shown, the passenger 404 may be using a mobile device and/or may be unaware that the vehicle 402 is proximate the pickup location.

In some examples, the vehicle 402 may determine whether there is a line of sight between the vehicle 402 and the passenger 404. The vehicle 402 can determine whether there is a line of sight to the passenger 404 by utilizing map data and/or current sensor data. For example, the vehicle may access map data (e.g., stored offline and/or within components of the vehicle 402) to determine whether there are any static objects between the vehicle 402 and the passenger 404. Further, the vehicle 402 may utilize sensor data captured by various sensors mounted on the vehicle 402 to determine whether any static and/or dynamic objects are located between the location of the passenger 404 and the location of the vehicle 402.

Based on determining that there is a line of sight between the vehicle 402 and the passenger 404, the vehicle 402 can notify and/or signal the passenger's attention by emitting directed light towards the passenger 404 and/or outputting directed audio towards the passenger 404. In this example, the vehicle 402 may output directed audio 406 directed towards the passenger 404. Example techniques for emitting directed sounds and/or light towards objects can be found, for example, in U.S. Pat. No. 11,104,269, filed Oct. 17, 2019, and titled "Dynamic Vehicle Warning Signal Emission" the contents of which is herein incorporated by reference in its entirety and for all purposes. Further, such techniques can be found in U.S. Pat. No. 9,878,664, filed Nov. 4, 2015, and titled "Method For Robotic Vehicle Communication With an External Environment Via Acoustic Beam Forming," the contents of which is herein incorporated by reference in its entirety and for all purposes.

In some examples, the vehicle 402 may modify the audio output and/or the light emission based on actions of the passenger 404. For instance, the vehicle 402 may determine that the passenger 404 is changing location (e.g., following a recommended path). In such instances, the vehicle 402 may modify the light and/or audio output by changing the volume of the audio output, changing the direction of audio output, changing the audio being output, changing the brightness of the light being output, changing the type of light being output, changing the direction light is being output, and/or any other modifying action.

In some examples, the passenger 404 may interact with the vehicle 402 to stop the audio and/or light. For instance, the passenger 404 may speak to the vehicle and/or into the passenger's user device indicating that the vehicle stops emitting light and/or audio. In such instances, the vehicle 402 may receive the user input and stop such actions. Additionally or alternatively, the vehicle 402 may modify the output of light and/or audio based on one or more gestures received from the passenger 404. For example, the passenger 404 may wave their hand indicating to the vehicle 402 that the passenger 404 has recognized the vehicle 402 and is proceeding to the vehicle 402. In such instances, the vehicle 402 may modify the audio and/or lighting output. Example techniques for gesture recognition can be found, for example, in U.S. application Ser. No. 17/320,678, filed May 14, 2021, and titled "Pedestrian Attribute and Gesture Detection" the contents of which is herein incorporated by reference in its entirety and for all purposes.

Additionally or alternatively, the vehicle 402 may emit sound and/or light to cause animals and/or pedestrians to move. For example, the vehicle 402 may identify an animal and/or a pedestrian proximate the vehicle 402. Based on user preferences (e.g., avoiding animals is important to the passenger), the vehicle 402 may direct the sound and/or lighting to the animal or pedestrian. In such instances, the vehicle 402 may emit light and/or sound directed at the animal and/or pedestrian requesting (e.g., scaring) that it leaves the proximity to the vehicle.

Figure 5:
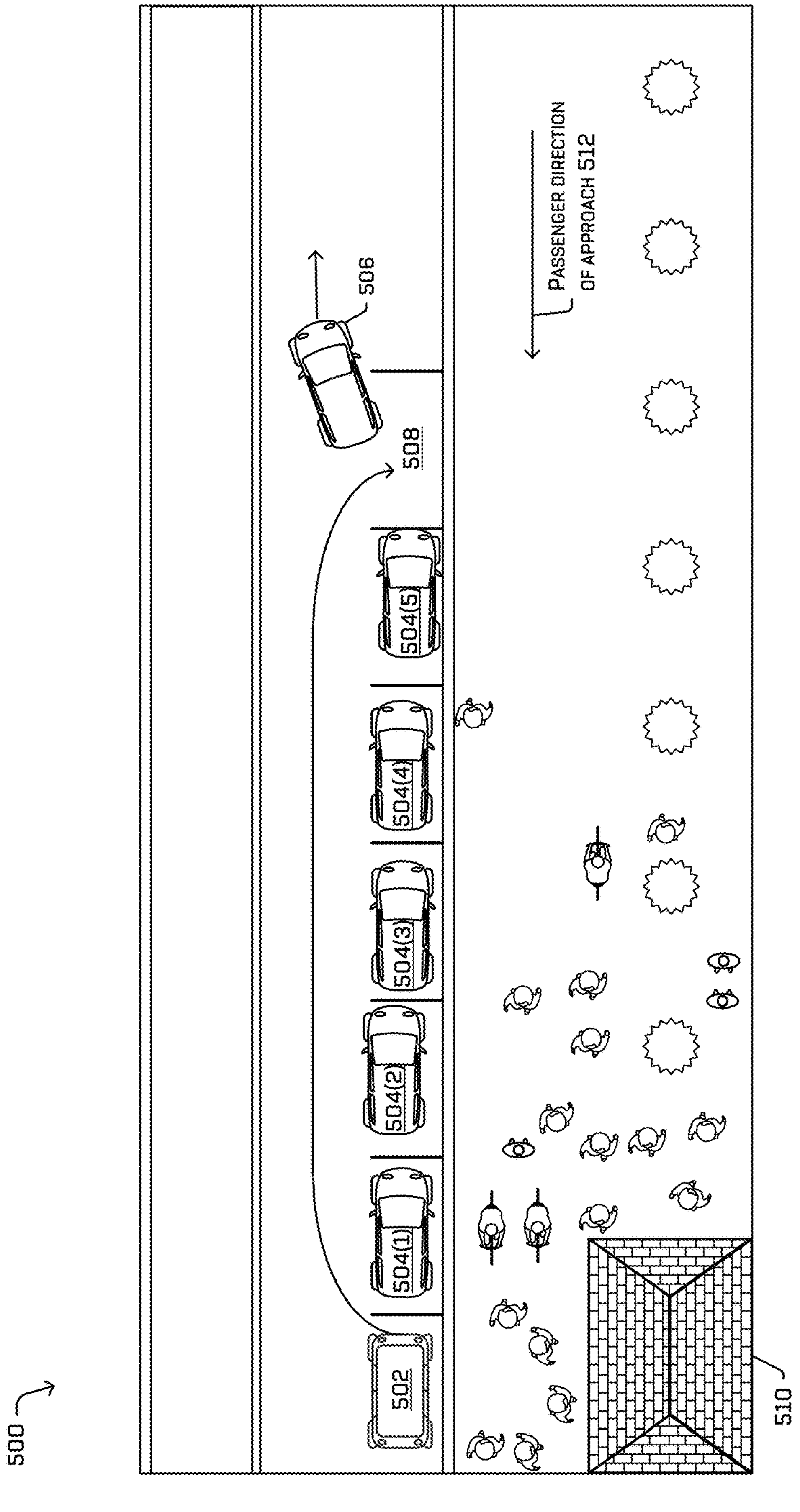
FIG. 5 depicts an example environment in which a vehicle changes pickup locations, in accordance with one or more examples of the disclosure.

FIG. 5 depicts an example environment 500 in which a vehicle changes pickup locations. Specifically, FIG. 5 illustrates a vehicle changing pickup locations based on a better pickup location becoming available.

In some examples, the example environment 500 may include a vehicle 502. In such examples, the vehicle 502 may be a passenger vehicle configured to transport passengers between pickup and drop off locations. As shown, the vehicle 502 may be parked in a parking stall for curbside parking. Further, it is shown that the other parking stalls are occupied by other vehicles. Specifically, vehicle 504(1), vehicle 504(2), vehicle 504(3), vehicle 504(3), and vehicle 504(5) may be parked in the other parking stalls.

In some examples, the vehicle 502 may be waiting to pick up a passenger for transportation. While waiting for the passenger to arrive at the pickup location, the vehicle 502 may continually capture sensor data to maintain an updated representation of the example environment 500. In this example, the vehicle 502 may determine based on analyzing the recently captured sensor data, that the vehicle 506 is leaving parking stall 508. In such instances, the vehicle 502 may determine whether to relocate to parking stall 508.

When determining whether to relocate pickup locations, the vehicle 502 may evaluate the passenger's preferences. The vehicle may access user preferences (e.g., found on the mobile application) of the passenger to determine which potential hazards are relevant and/or important to the passenger. In this example, the user preferences of the passenger may indicate that the passenger has identified groups of pedestrians to be a potential hazard. As such, the vehicle 502 may capture and/or analyze sensor data of the region proximate the vehicle 502. In this case, the vehicle 502 may determine that a group of pedestrians are proximate the vehicle, as the vehicle 502 is parked next to a store 510. Further, the vehicle 502 can determine that the region proximate the parking stall 508 has little to no potential hazards. In some examples, the vehicle 502 can also determine which direction the passenger is approaching from. The vehicle 502 can determine where the passenger is approaching from based on using location data from geolocating the user device of the passenger. As shown, the passenger may be approaching from a direction 512 towards the parking stall 508.

In some examples, the vehicle 502 can communicate with the passenger regarding whether to relocate to the parking stall 508. For example, the vehicle 502 may determine that it is relocating to the parking stall 508 and may transmit a message to the passenger indicating as much. In such an example, the message may include a map illustrating the location to where the vehicle is relocating. In other examples, the vehicle 502 may transmit a message to the passenger. The message may inform the passenger of the potential hazards and/or alternative available parking. In such instances, the vehicle 502 may request that the passenger provides input regarding whether the passenger would like the vehicle 502 to relocate to the parking stall 508. Upon receiving a response (e.g., user input) from the passenger to relocate, the vehicle 502 may navigate to the parking stall 508.

Figure 6:
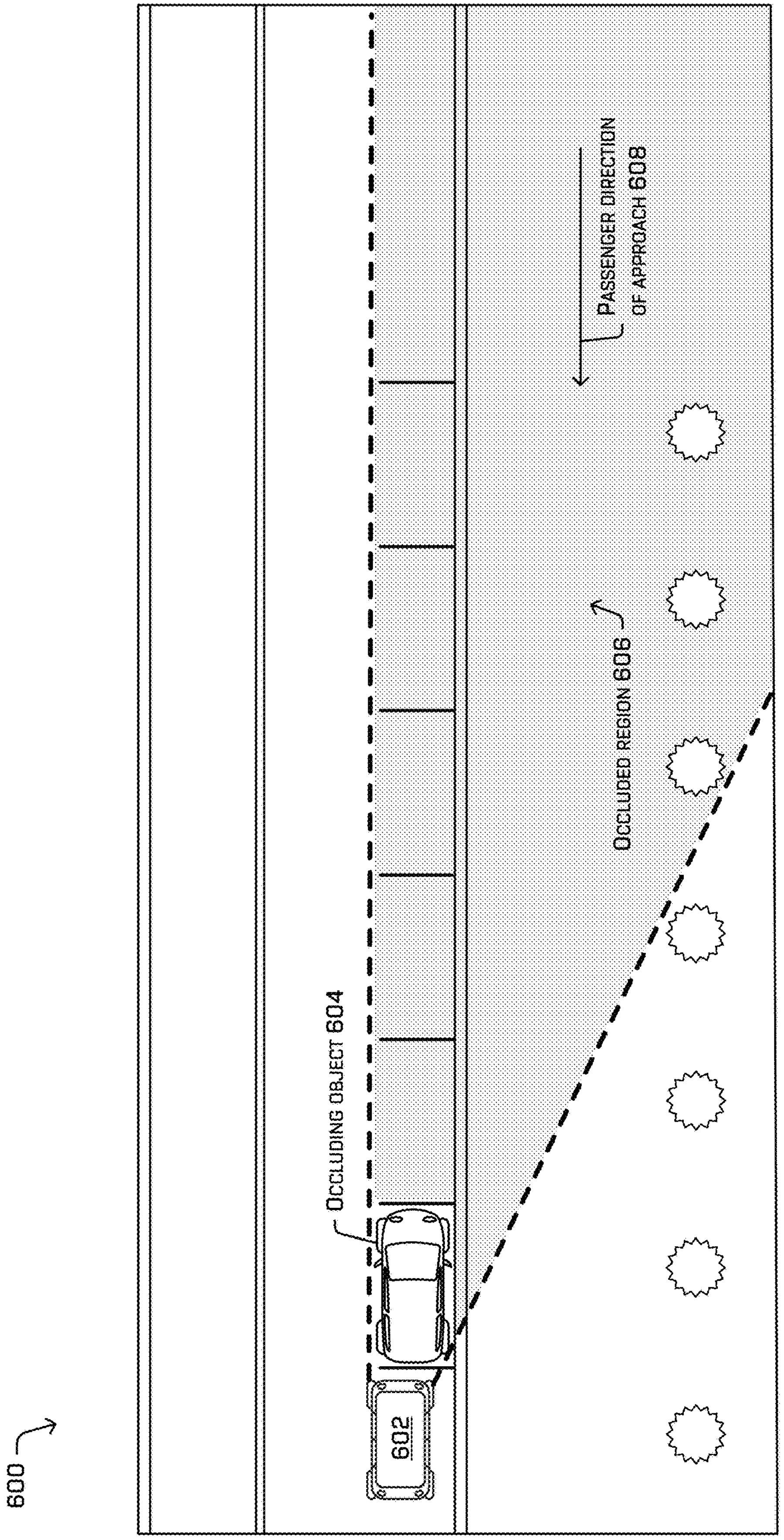
FIG. 6 depicts an example environment in which a vehicle detects an occluded region proximate the pickup location, in accordance with one or more examples of the disclosure.

FIG. 6 depicts an example environment 600 in which a vehicle detects an occluded region proximate the pickup location.

In this example, the example environment 600 may include a vehicle 602. In such examples, the vehicle 602 may be a passenger vehicle configured to transport passengers between pickup and drop off locations. As shown, the vehicle 602 may be parked in a parking stall for curbside parking. Further, it is shown that another parking stall is occupied by vehicle 604.

In some examples, the vehicle 602 may be waiting to pick up a passenger for transportation. While waiting for the pedestrian to arrive at the pickup location, the vehicle 602 may capture sensor data to determine whether potential hazards are proximate the vehicle 602. In this example, the vehicle 602 may determine that a region 606 of the environment is occluded by the vehicle 604. The vehicle 602 may determine whether the occluded region 606 is a potential hazard based on determining whether a risk value of the occluded region 606 meets or exceeds a threshold value. The vehicle 602 can determine a risk value based on a size of the region, historical data of the region (e.g., past problems within the region), distance from the vehicle to the region, lighting conditions in and/or around the region, a direction 608 from which the passenger is approaching, and/or any other factor. In some instances, the vehicle 602 may determine a weighted risk value which indicates the degree of risk associated with the passenger navigating through the region 606. In this example, the vehicle 602 may determine that the region 606 has a large size, is close to the vehicle 602, and has standard lighting. Further, the vehicle 602 may determine that the passenger is approaching from a direction 608 which would include the passenger navigating through the occluded region 606. As such, the vehicle 602 may transmit a message to a user device of the passenger stating, "use caution—the vehicle 602 is unable to determine what is within portions of the environment." Of course such language is just an example, and in other examples the message may state alternative language. In addition, the message may include a map illustrating the region which is occluded. Such a map may inform the passenger where to exercise added caution.

Alternatively or additionally, the vehicle 602 may transmit a message to the passenger requesting input as to whether the passenger would like the vehicle to relocate to another parking space. In such instances, the vehicle 602 may receive user input which may cause the vehicle to stay in its current parking space or to change parking spaces.

Figure 7:
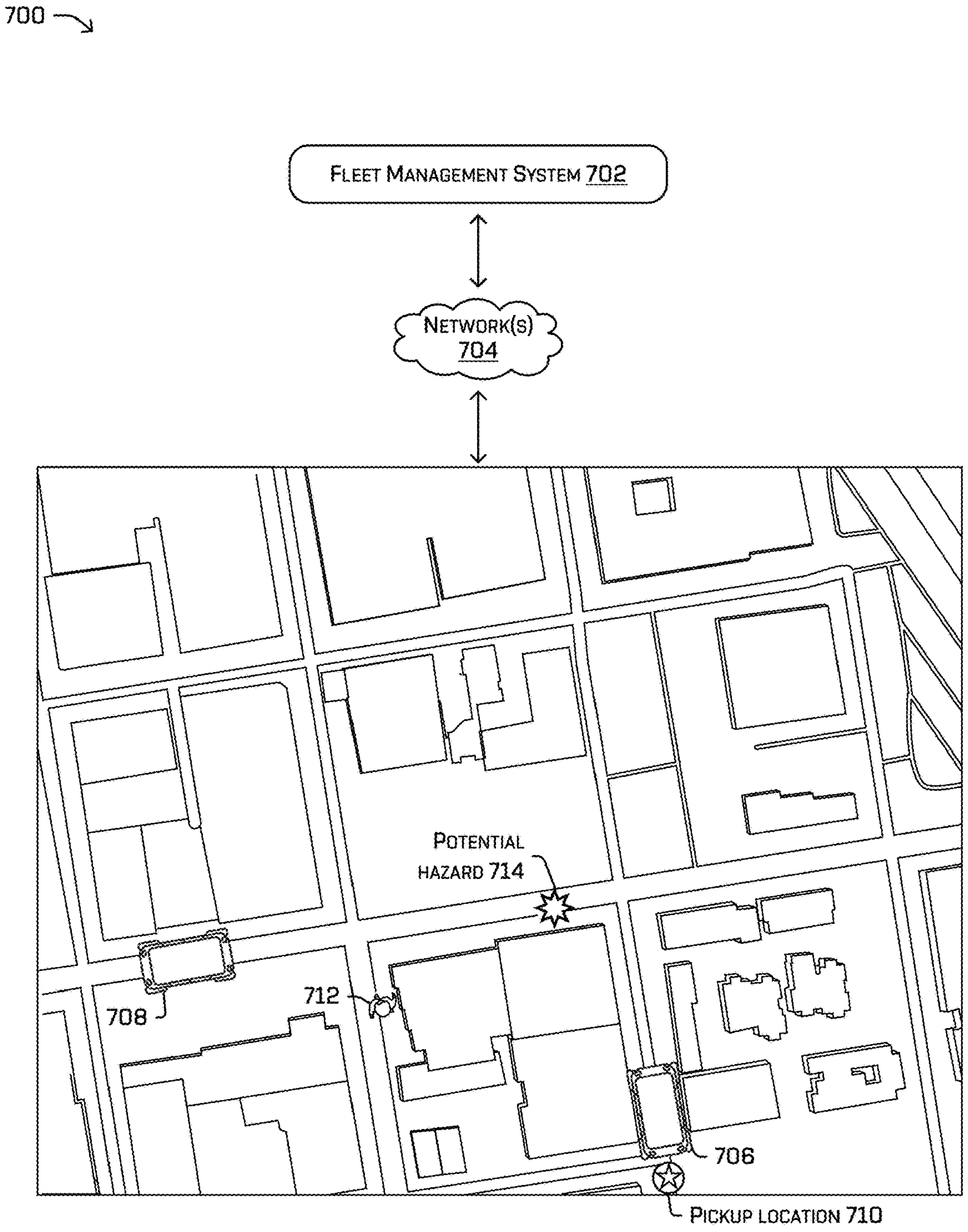
FIG. 7 depicts an example environment in which a fleet management system sends potential hazard information based on sensor data received from a fleet of vehicles, in accordance with one or more examples of the disclosure.

FIG. 7 depicts an example environment 700 in which a fleet management system sends potential hazard information based on sensor data received from a fleet of vehicles.

In this example, the example environment 700 may include a fleet management system 702. The fleet management system 702 may be a component integrated as a separate server-based system. However, in other examples, the fleet management system 702 may be integrated within systems of a vehicle. The fleet management system 702 may deploy and/or manage a fleet of vehicles covering (e.g., servicing) a specified portion of the environment. Further, the fleet management system 702 may coordinate pick up and drop off requests from future passengers, providing suggested routes to individual vehicles in the fleet of vehicles, identify potential hazards based on the sensor data captured from the vehicles within the fleet of vehicles, etc. In some examples, the fleet of vehicles may send data (e.g., sensor data) to the fleet management system 702 and receive data from the fleet management system 702 through a network(s) 704.

As shown, the example environment 700 includes a vehicle 706 and a vehicle 708. In this example, the vehicle 706 and the vehicle 708 may be taxi service vehicles configured to transport passengers between pickup and drop off locations. In some examples, the vehicle 706 may be parked at a pickup location 710. In some examples, the vehicle 706 may be waiting to provide transportation to a passenger 712. In this example, the passenger 712 is not at the pickup location 710. The passenger 712 may be walking to the pickup location 710. In some examples, the vehicle 708 may be tasked with transporting a separate passenger to a destination.

The example environment 700 may include a potential hazard 714. In this instance, the potential hazard 714 may be out of the passenger's 712 and vehicle's 706 line of sight. As such, the vehicle 706 may be unable to detect such a potential hazard and as such, the vehicle 706 may be unable to notify the passenger 712 of such a potential hazard 714. In some examples, the vehicle 708 may capture and/or send sensor data to the fleet management system 702 which analyze such sensor data. The fleet management system 702 may use the sensor data to detect the potential hazard 714. In such instances, the fleet management system 702 may transmit a message to the vehicle 706 and/or to a user device of the passenger 712 to notify the passenger 712 of the potential hazard 714. In such instances, the passenger 712 may continue walking past the potential hazard and/or may request the vehicle 706 change pickup locations such that the passenger 712 can avoid encountering the potential hazard 714.

Figure 8A:
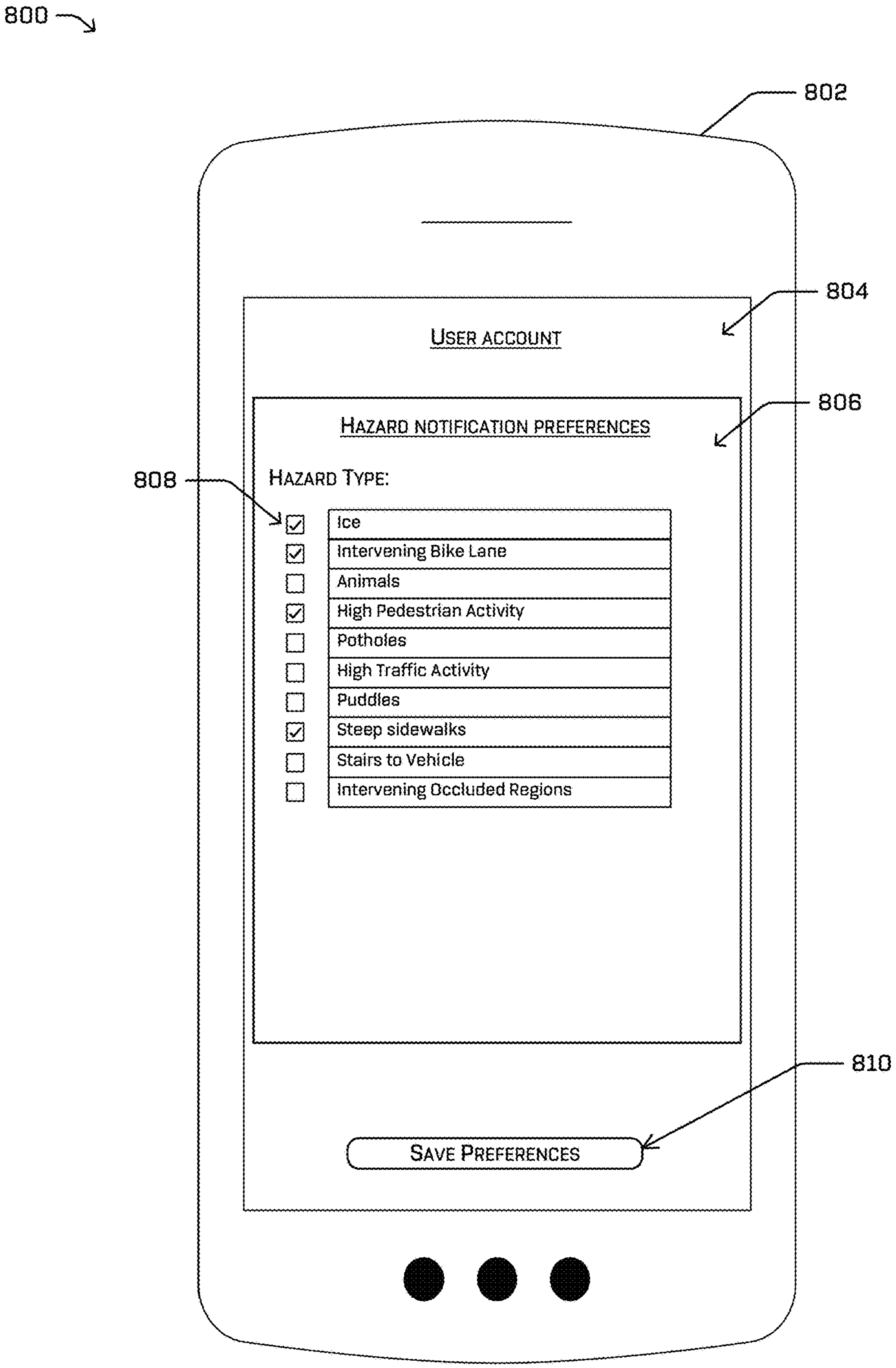
FIG. 8A depicts an example user interface of a mobile application that may be generated and rendered on a user device, in accordance with one or more examples of the disclosure.
Figure 8B:
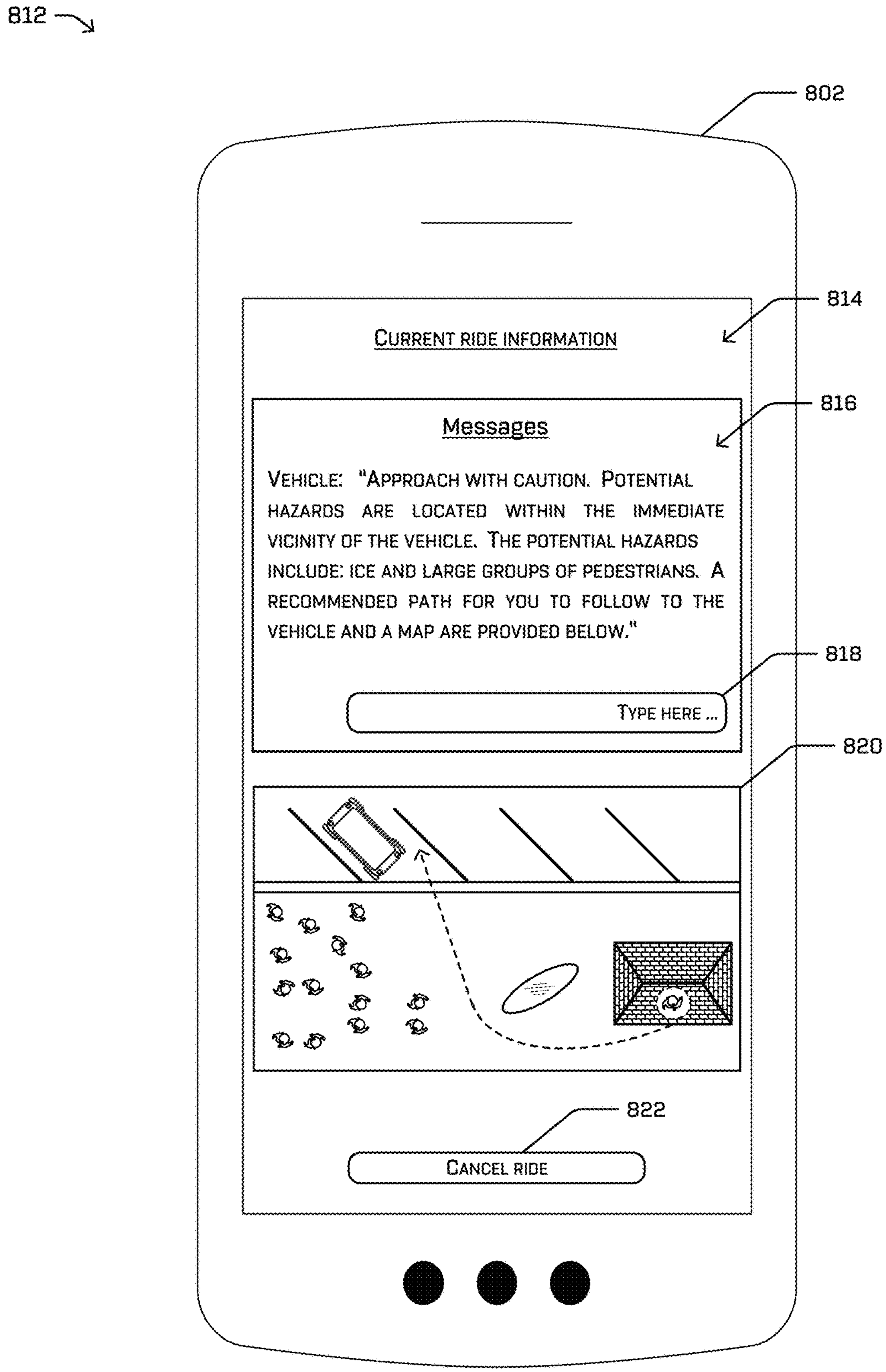
FIG. 8B depicts an example user interface of a mobile application that may be generated and rendered on a user device, in accordance with one or more examples of the disclosure.

FIGS. 8A and 8B depict example user interfaces of a mobile application that may be generated and rendered on a user device. The user interfaces may represent a user interface generated by a ride-hailing or ride-sharing application executing on the user device, and configured to allow a user to request a ride from a transportation system. In some examples, the user interfaces may correspond to the user interface screens described above.

FIG. 8A illustrates an example user interface 800 from which a passenger may determine which potential hazards are relevant and/or important to them.

In some examples, the example user interface 800 includes a section associated with user account 804. The user account 804 may be a section of the mobile application which allows users to provide information about themselves. For example, users may provide information about which potential hazards are relevant and/or important to them. Specifically, the user account 804 section may include a hazard notification preferences 806 section that includes a set of input fields that allow the user to indicate which potential hazards they would like to avoid in the environment.

In some examples, the hazard notification preferences 806 section may include a list of one or more potential hazards. The potential hazard(s) may be associated with a user input field 808 which may include a check mark if selected by the user. However, this is not intended to be limiting, in other examples users may be able to input which potential hazards to avoid using one or more different methods. Though not shown, the hazard notification preference 806 section may include a section enabling the user to rank the potential hazards. For example, the user may indicate that a first potential hazard is ranked higher (e.g., more important to avoid) than a second potential hazard.

In this example, the user interface 800 may include a save preferences field 810 which will allow the user to save changes made to the user account 804. A user may access and/or modify their hazard notification preferences 806 at any time.

In some examples, a vehicle may access the user account 804 to determine which potential hazards a passenger has identified as relevant and/or important. Upon identifying such potential hazards, the vehicle may determine whether such potential hazards are present proximate the vehicle and/or notify the user associated with the user account 804.

FIG. 8B illustrates a message that has been sent from a vehicle at a pickup location.

In some examples, the example user interface 812 may include a current ride information 814 section within the application. The current ride information 814 may provide information to the user regarding a ride the user has scheduled. The current ride information 814 section may include a messages 816 section. The user may utilize the messages 816 section to communicate to the vehicle. As shown, the messages 816 section may include a message from the vehicle stating "Approach with caution. Potential hazards are located within the immediate vicinity of the vehicle. The potential hazards include: ice and large groups of pedestrians. A recommended path for you to follow to the vehicle and a map are provided below." The messages 816 section also includes a messaging input field 818 allowing the user to send one or more messages to the vehicle. In some instances, the user may send messages that include confirming or denying a vehicle action, requesting the vehicle to change pickup locations, and/or any other action.

The current ride information 814 section may include a map 820 of the region proximate the vehicle and/or pickup location. The map 820 may illustrate where the one or more potential hazards are located and/or a recommended path for the user to follow to the vehicle. Further, the map 820 may include a representation of the vehicle, specifically the vehicle doors and/or a seating location for the passenger. In some examples, the map 820 may be interactive. In such examples, the user may modify the recommended path and/or select particular parking spaces for the vehicle to relocate to. Such interactions may cause a message to be sent to the vehicle. The message may inform the vehicle of the changes made by the user.

In some examples, the current ride information 814 section may include a cancel ride input field 822. In some instances, the user may cancel the ride based on being uncomfortable navigating to the vehicle due to the presence of the potential hazards.

Figure 9:
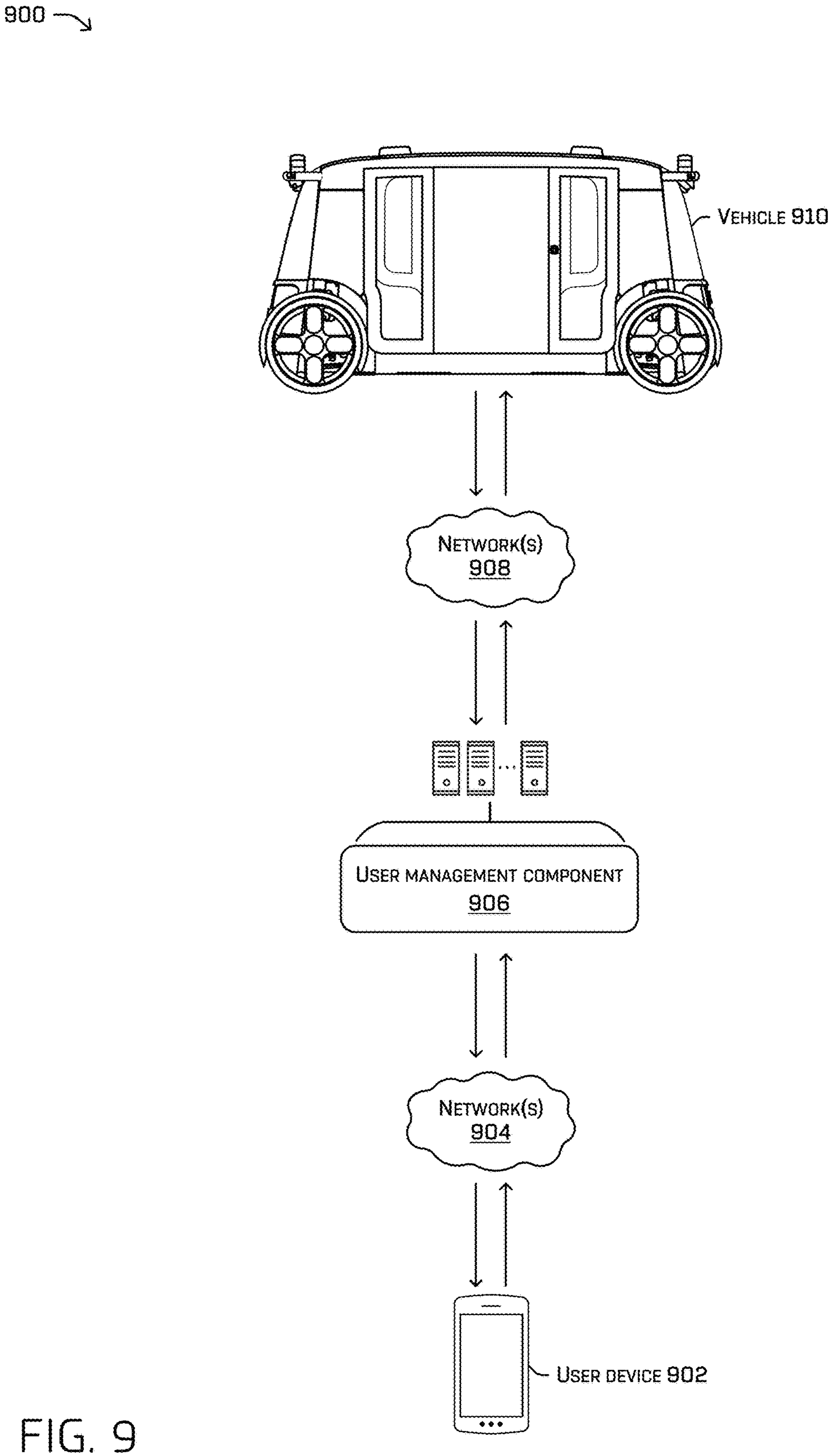
FIG. 9 is a block diagram depicting an example computing environment for implementing various techniques described herein.

FIG. 9 illustrates an example computing environment 900 including a configuration of components configured to implement various techniques discussed herein.

For example, computing environment 900 may be used to illustrate systems and methods of requesting, scheduling, messaging, executing, and/or coordinating passenger transports using autonomous vehicles. As shown in this example, a passenger trip may be initiated and requested by user (also referred to as a passenger) operating a user device 902. The user device 902 may comprise a mobile device such as a mobile phone, laptop or tablet computer, smart watch, wearable computing device, and/or any other personal computing device. The user device 902 may communicate via a first network 904 with a user management component 906. The user management component 906 may be similar or identical to the user management component described in FIGS. 1-8B. In some instances, the user management component 906 may be configured to receive such requests and/or messages from the user device 902 and transmit such messages via a wireless communication network 908 to a vehicle 910 to coordinate pickup and/or drop-offs, provide user notifications, and/or modify pickup locations.

The vehicle 910 may correspond to any of the vehicles described herein, and thus may include any features or combination of vehicles features discussed below. Although vehicle 910 may be implemented as fully or partially autonomous vehicle, in various examples some or all of techniques described herein may use non-autonomous vehicles for passenger transport as well. The user management component 906 may be implemented using one or more computing devices or systems operating separately and independently, or may be fully or partially integrated within the user device 902 and/or with vehicle 910.

In this example, computing environment 900 illustrates a simplified scenario for requesting passenger transportation, receiving messages from the vehicle 910, and/or sending messages to the vehicle 910. In response to the request from the user device 902, the user management component 906 may transmit the request and/or instructions from one or more other components to the vehicle 910. In such instances, the vehicle 910 may determine or otherwise identify potential hazards proximate the vehicle 910. The vehicle 910 may also determine a recommended path for a passenger to follow to the vehicle 910. As noted above, the vehicle 910 may transmit a message that includes the potential hazard(s) and/or the recommended path via the network(s) 908 to the user management component 906. The user management component 906 may transmit such information to the user device 902 to be displayed for the user.

Transmissions to and from vehicle 910 may be sent via one or more wireless communication networks 908, such as cellular or WLAN networks for longer-range communications and/or Bluetooth, WiFi, or NFC for short-range communications. Although FIG. 9 is depicted with unidirectional arrows to illustrate the simple passenger and baggage transportation request and execution process outlined above, it should be understood that each device and system in this example may perform bi-directional communications with any or all other devices and systems.

Figure 10:
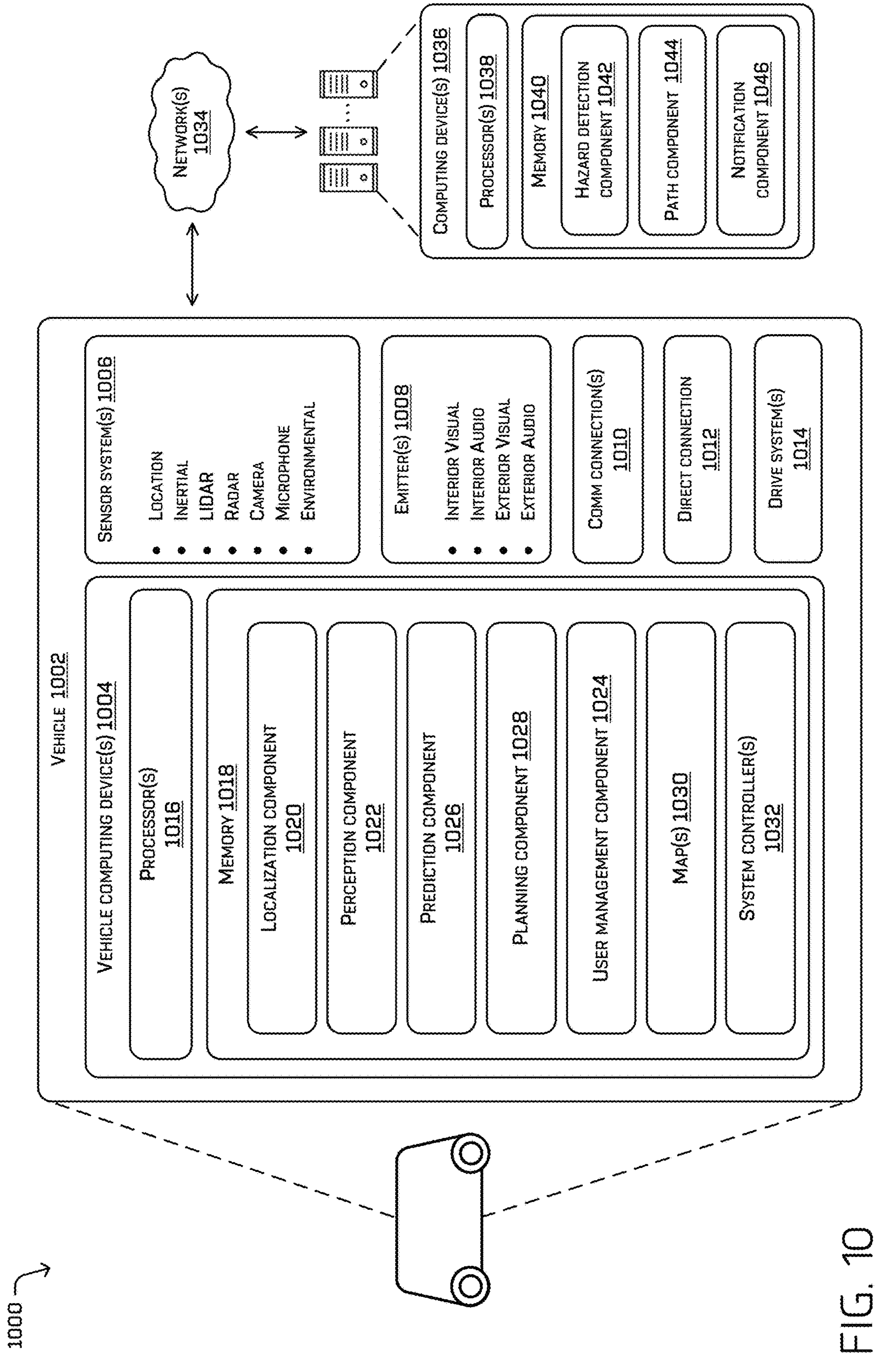
FIG. 10 depicts a block diagram of an example system for implementing various techniques described herein.

FIG. 10 is a block diagram of an example system 1000 for implementing the techniques described herein. In at least one example, the system 1000 may include a vehicle, such as vehicle 1002. The vehicle 1002 may include one or more vehicle computing devices 1004, one or more sensor systems 1006, one or more emitters 1008, one or more communication connections 1010, at least one direct connection 1012, and one or more drive systems 1014.

The vehicle computing device 1004 may include one or more processors 1016 and memory 1018 communicatively coupled with the processor(s) 1016. In the illustrated example, the vehicle 1002 is an autonomous vehicle; however, the vehicle 1002 could be any other type of vehicle, such as a semi-autonomous vehicle, or any other system having at least an image capture device (e.g., a camera-enabled smartphone). In some instances, the autonomous vehicle 1002 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 1002 may be a fully or partially autonomous vehicle having any other level or classification.

In the illustrated example, the memory 1018 of the vehicle computing device 1004 stores a localization component 1020, a perception component 1022, a prediction component 1026, a planner component 1028, a user management component 1024, one or more system controllers 1032, and one or more maps 1030 (or map data). Though depicted in FIG. 10 as residing in the memory 1018 for illustrative purposes, it is contemplated that the localization component 1020, the perception component 1022, the prediction component 1026, the planner component 1028, the user management component 1024, system controller(s) 1032, and/or the map(s) may additionally, or alternatively, be accessible to the vehicle 1002 (e.g., stored on, or otherwise accessible by, memory remote from the vehicle 1002, such as, for example, on memory 1040 of one or more computing device 1036 (e.g., a remote computing device)). In some examples, the memory 1040 may include a hazard detection component 1042, a path component 1044, and a notification component 1046.

In at least one example, the localization component 1020 may include functionality to receive sensor data from the sensor system(s) 1006 to determine a position and/or orientation of the vehicle 1002 (e.g., one or more of an x-, y-, z-position, roll, pitch, or yaw). For example, the localization component 1020 may include and/or request/receive a map of an environment, such as from map(s) 1030, and may continuously determine a location and/or orientation of the vehicle 1002 within the environment. In some instances, the localization component 1020 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 1002. In some instances, the localization component 1020 may provide data to various components of the vehicle 1002 to determine an initial position of the vehicle 1002 for determining the relevance of an object to the vehicle 1002, as discussed herein.

In some instances, the perception component 1022 may include functionality to perform object detection, segmentation, and/or classification. In some examples, the perception component 1022 may provide processed sensor data that indicates a presence of an object (e.g., entity) that is proximate to the vehicle 1002 and/or a classification of the object as an object type (e.g., car, pedestrian, cyclist, animal, building, tree, road surface, curb, sidewalk, unknown, etc.). In some examples, the perception component 1022 may provide processed sensor data that indicates a presence of a stationary entity that is proximate to the vehicle 1002 and/or a classification of the stationary entity as a type (e.g., building, tree, road surface, curb, sidewalk, unknown, etc.). In additional or alternative examples, the perception component 1022 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 1026 may generate one or more probability maps representing prediction probabilities of possible locations of one or more objects in an environment. For example, the prediction component 1026 may generate one or more probability maps for vehicles, pedestrians, animals, and the like within a threshold distance from the vehicle 1002. In some instances, the prediction component 1026 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 1026 may generate predicted trajectories of objects (e.g., objects) in an environment. For example, the prediction component 1026 may generate one or more predicted trajectories for objects within a threshold distance from the vehicle 1002. In some examples, the prediction component 1026 may measure a trace of an object and generate a trajectory for the object based on observed and predicted behavior.

In general, the planner component 1028 may determine a path for the vehicle 1002 to follow to traverse through an environment. For example, the planner component 1028 may determine various routes and trajectories and various levels of detail. For example, the planner component 1028 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 1028 may generate an instruction for guiding the vehicle 1002 along at least a portion of the route from the first location to the second location. In at least one example, the planner component 1028 may determine how to guide the vehicle 1002 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 1028 may select a trajectory for the vehicle 1002.

In other examples, the planner component 1028 may alternatively, or additionally, use data from the localization component 1020, the perception component 1022, and/or the prediction component 1026 to determine a path for the vehicle 1002 to follow to traverse through an environment. For example, the planner component 1028 may receive data (e.g., object data) from the localization component 1020, the perception component 1022, and/or the prediction component 1026 regarding objects associated with an environment. In some examples, the planner component 1028 receives data for relevant objects within the environment. Using this data, the planner component 1028 may determine a route to travel from a first location (e.g., a current location) to a second location (e.g., a target location) to avoid objects in an environment. In at least some examples, such a planner component 1028 may determine there is no such collision-free path and, in turn, provide a path that brings vehicle 1002 to a safe stop avoiding all collisions and/or otherwise mitigating damage.

The user management component 1024 may be perform any of the techniques described with respect to any of FIGS. 1-9 above with respect to identifying potential hazards proximate a pickup location, determining a recommended path based on the potential hazards, and transmitting a message including the potential hazards and the recommended path to a user.

In at least one example, the vehicle computing device 1004 may include one or more system controllers 1032, which may be configured to control steering, propulsion, braking, safety, emitters, communication, and other systems of the vehicle 1002. The system controller(s) 1032 may communicate with and/or control corresponding systems of the drive system(s) 1014 and/or other components of the vehicle 1002.

The memory 1018 may further include one or more maps 1030 that may be used by the vehicle 1002 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1002 may be controlled based at least in part on the map(s) 1030. That is, the map(s) 1030 may be used in connection with the localization component 1020, the perception component 1022, the prediction component 1026, and/or the planner component 1028 to determine a location of the vehicle 1002, detect objects in an environment, generate routes, determine actions and/or trajectories to navigate within an environment.

In some examples, the one or more maps 1030 may be stored on a remote computing device(s) (such as the computing device(s) 1036) accessible via network(s) 1034. In some examples, multiple maps 1030 may be stored based on, for example, a characteristic (e.g., type of entity, time of day, day of week, season of the year, etc.). Storing multiple maps 1030 may have similar memory requirements, but increase the speed at which data in a map may be accessed.

In some instances, aspects of some or all of the components discussed herein may include any models, techniques, and/or machine-learned techniques. For example, in some instances, the components in the memory 1018 (and the memory 1040, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 1006 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1006 may include multiple instances of each of these or other types of sensors. For instance, the lidar sensors may include individual lidar sensors located at the corners, front, back, sides, and/or top of the vehicle 1002. As another example, the camera sensors may include multiple cameras disposed at various locations about the exterior and/or interior of the vehicle 1002. The sensor system(s) 1006 may provide input to the vehicle computing device 1004. Additionally, or in the alternative, the sensor system(s) 1006 may send sensor data, via the one or more networks 1034, to the one or more computing device(s) 1036 at a particular frequency, after a lapse of a predetermined period of time, in near real-time, etc.

The vehicle 1002 may also include one or more emitters 1008 for emitting light and/or sound. The emitter(s) 1008 may include interior audio and visual emitters to communicate with passengers of the vehicle 1002. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1008 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1002 may also include one or more communication connections 1010 that enable communication between the vehicle 1002 and one or more other local or remote computing device(s). For instance, the communication connection(s) 1010 may facilitate communication with other local computing device(s) on the vehicle 1002 and/or the drive system(s) 1014. Also, the communication connection(s) 1010 may allow the vehicle to communicate with other nearby computing device(s) (e.g., computing device 1036, other nearby vehicles, etc.) and/or one or more remote sensor system(s) for receiving sensor data. The communications connection(s) 1010 also enable the vehicle 1002 to communicate with a remote teleoperations computing device or other remote services.

The communications connection(s) 1010 may include physical and/or logical interfaces for connecting the vehicle computing device 1004 to another computing device or a network, such as network(s) 1034. For example, the communications connection(s) 1010 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1002 may include one or more drive systems 1014. In some examples, the vehicle 1002 may have a single drive system 1014. In at least one example, if the vehicle 1002 has multiple drive systems 1014, individual drive systems 1014 may be positioned on opposite ends of the vehicle 1002 (e.g., the front and the rear, etc.). In at least one example, the drive system(s) 1014 may include one or more sensor systems to detect conditions of the drive system(s) 1014 and/or the surroundings of the vehicle 1002. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 1014. In some cases, the sensor system(s) on the drive system(s) 1014 may overlap or supplement corresponding systems of the vehicle 1002 (e.g., sensor system(s) 1006).

The drive system(s) 1014 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1014 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 1014. Furthermore, the drive system(s) 1014 may also include one or more communication connection(s) that enable communication by the respective drive module with one or more other local or remote computing device(s).

In at least one example, the direct connection 1012 may provide a physical interface to couple the one or more drive system(s) 1014 with the body of the vehicle 1002. For example, the direct connection 1012 may allow the transfer of energy, fluids, air, data, etc. between the drive system(s) 1014 and the vehicle. In some instances, the direct connection 1012 may further releasably secure the drive system(s) 1014 to the body of the vehicle 1002.

In at least one example, the localization component 1020, the perception component 1022, the user management component 1024, the prediction component 1026, the planner component 1028, the one or more system controllers 1032, and the one or more maps 1030 may process sensor data, as described above, and may send their respective outputs, over the one or more network(s) 1034, to the computing device(s) 1036. In at least one example, the localization component 1020, the perception component 1022, the user management component 1024, the prediction component 1026, the planner component 1028, the one or more system controllers 1032, and the one or more maps 1030 may send their respective outputs to the computing device(s) 1036 at a particular frequency, after a lapse of a predetermined period of time, in near real-time, etc.

In some examples, the vehicle 1002 may send sensor data to the computing device(s) 1036 via the network(s) 1034. In some examples, the vehicle 1002 may receive sensor data from the computing device(s) 1036 and/or remote sensor system(s) via the network(s) 1034. The sensor data may include raw sensor data and/or processed sensor data and/or representations of sensor data. In some examples, the sensor data (raw or processed) may be sent and/or received as one or more log files.

The computing device(s) 1036 may include processor(s) 1038 and a memory 1040, which may include a hazard detection component 1042, a path component 1044, and a notification component 1046. In some examples, the memory 1040 may store one or more of components that are similar to the component(s) stored in the memory 1018 of the vehicle 1002. In such examples, the computing device(s) 1036 may be configured to perform one or more of the processes described herein with respect to the vehicle 1002. In some examples, the hazard detection component 1042, the path component 1044, and the notification component 1046 may perform substantially similar functions as the user management component 1024.

The processor(s) 1016 of the vehicle 1002 and the processor(s) 1038 of the computing device(s) 1036 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1018 and memory 1040 are examples of non-transitory computer-readable media. The memory 1018 and memory 1040 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 10 is illustrated as a distributed system, in alternative examples, components of the vehicle 1002 may be associated with the computing device(s) 1036 and/or components of the computing device(s) 1036 may be associated with the vehicle 1002. That is, the vehicle 1002 may perform one or more of the functions associated with the computing device(s) 1036, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 11:
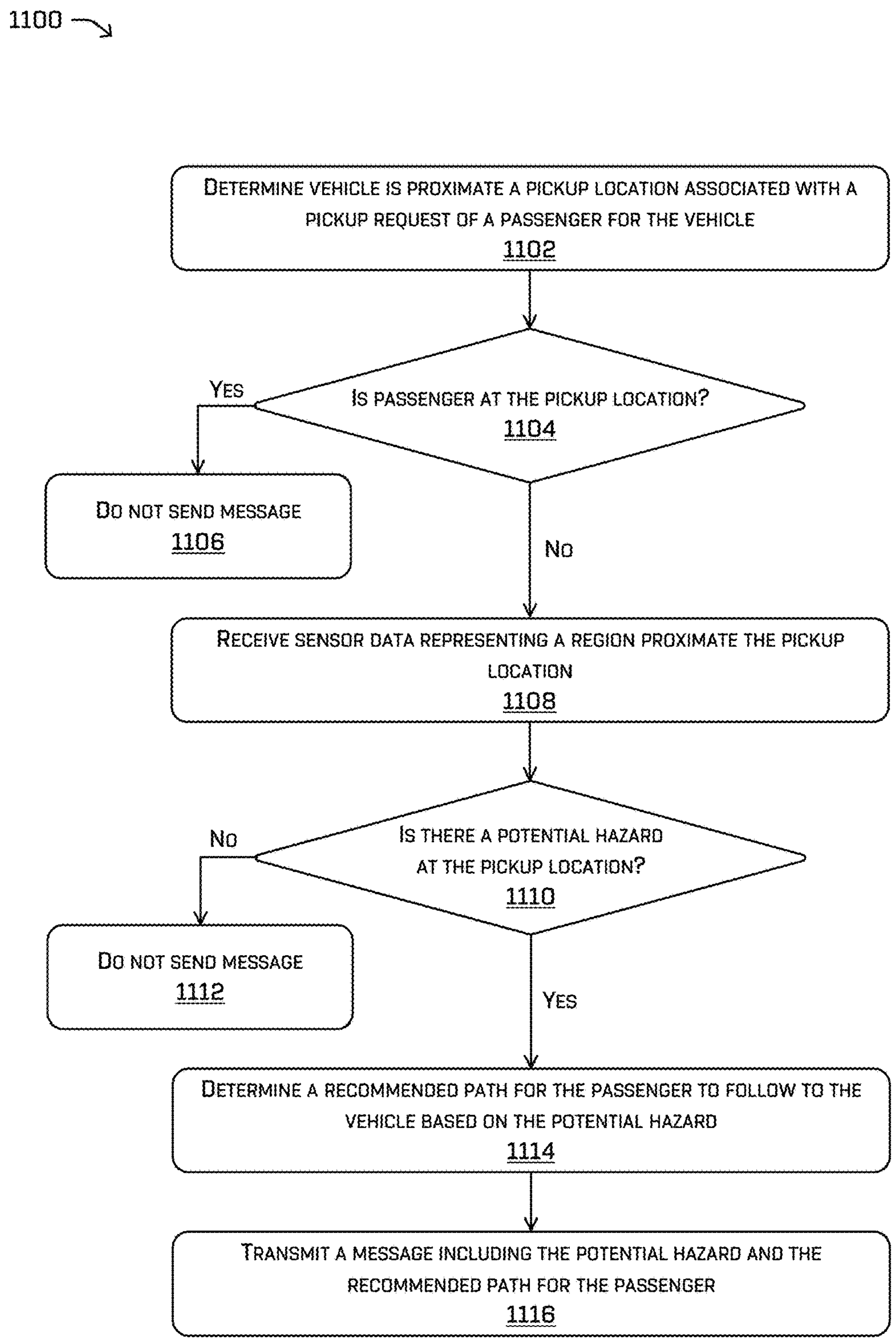
FIG. 11 is a flow diagram illustrating an example process of determining a passenger is not located at a pickup location, determining a potential hazard proximate the pickup location, determining a recommended path based on a location of the potential hazard, and transmitting a message that includes the potential hazard and/or the recommended path to the passenger, in accordance with one or more examples of the disclosure.

FIG. 11 is a flow diagram illustrating an example process 1100 of detecting a potential hazard proximate a pickup location based on sensor data, determining a recommended path based on the potential hazard, and transmitting a message including the potential hazards and the recommended path to a user. As described below, the example process 1100 may be performed by one or more computer-based components configured to implement various functionalities described herein. For instance, process 1100 may be performed by a user management component 202. As described above, the user management component 202 may be integrated as an on-vehicle system in some examples. However, in other examples, the user management component 202 may be integrated as a separate server-based system.

Process 1100 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 1102, the user management component may determine that a vehicle is proximate a pickup location associated with a pickup request of a passenger from the vehicle. The user management component may receive a request and/or instructions to navigate to a location within an environment. The request may include transporting pedestrians, customers, and/or passengers between pickup and drop off locations. The user management component may receive the request from an application (e.g., a ride sharing application) operating on a user device (e.g., mobile phone, tablet, computer, etc.) of a passenger. Upon receiving the request, user management component or any other component of the vehicle may instruct the vehicle to navigate to the pickup location.

At operation 1104, the user management component may determine whether the passenger is located at the pickup location. A pickup location may be a location in the environment where the vehicle is requested to pick up a passenger for transportation. The user management component may determine whether the passenger is within a region proximate the pickup location and/or at the pickup location based on user device data and/or sensor data captured from sensors of the vehicle. For instance, in examples in which users have opted in or granted permission to share their locations, the user management component may use user location data obtained from geolocating users that are using the mobile application. If the location data indicates that the user is outside of the region and/or beyond a threshold distance from the vehicle, the user management component may determine that the passenger is not located at the pickup location and/or within a region proximate the pickup location. Additionally or alternatively, the user management component may capture and/or evaluate sensor data from one or more sensor modalities to determine and/or confirm the determination made by geolocating the user device. As such, if the passenger is located at the pickup location (1104: Yes), then the user management component may not send a notification message to the passenger. At operation 1106, the user management component may proceed by configuring the vehicle to allow the passenger to enter the vehicle for transportation.

In contrast, if the passenger is not located at the pickup location (1104: No), the user management component may receive sensor data representing the region proximate the pickup location. At operation 1108, the user management component may receive the sensor data from one or more sensor devices mounted or installed at different locations on the vehicle and/or a same sensor device at different times. The sensor devices may include one or more lidar devices, one or more image capturing devices, one or more radar devices, one or more time-of-flight devices, and/or any other type of sensor device. In some examples, the sensor devices may be configured to capture sensor data while the vehicle is at and/or proximate the pickup location.

At operation 1110, the user management component may determine whether there is a potential hazard at the pickup location. A potential hazard may include an occluded region proximate the pickup location, a region of the ground having ice, a region of the ground having snow, a region of the ground having water, poor weather conditions (e.g., rain, hail, snow, wind, etc.), elevated traffic levels (e.g., vehicles, bicycles, etc.) proximate the pickup location, elevated pedestrian activity proximate the pickup location, the presence of animals and/or the presence of certain types of animals proximate the pickup location (e.g., within a threshold distance), an intervening bicycle lane, an object predicted to enter the pickup location, a sound of an emergency vehicle, a region of the ground having a pothole, a pedestrian smoking, and/or any other circumstance. In some examples, the user management component may have a comprehensive list of potential hazards. In such examples, the user management component may determine whether any of the potential hazards in the list of potential hazards are present within a region of the pickup location. Alternatively or additionally, the user management component may access a user profile (e.g., for the application) of the passenger to identify potential hazards that the user has identified as important and/or relevant to the passenger. In such instances, the user manager may determine whether any of the important and/or relevant potential hazards are located within a region proximate to the pickup location.

In some examples, the user management component may use one or more machine learning models trained to detect one or more types of potential hazards. In some examples, the user management component may have one or more machine learning models configured to perform such functions. The machine learning models can be trained to output a potential hazard. For example, the user management component may input a combination of sensor data (from any number of sensor modalities), map data, historical data, and/or user preferences into the trained machine learning model. Further, the machine learning models may be configured to output one or more types of potential hazards. As such, the user management component may utilize the one or more machine learning models to determine whether a potential hazard is present within a region proximate the pickup location. If there is not a potential hazard at the pickup location (1110: No), the user management component may not send a notification message to the passenger. At operation 1112, the user management component may determine that the region proximate the pickup location is free of potential hazards and/or that a message is not to be sent to the passenger.

In contrast, if there is a potential hazard at the pickup location (1110: Yes), the user management component may determine a recommended path for the passenger to follow to the vehicle. At operation 1114, the user management component may determine or otherwise generate a recommended path for the passenger to follow to the vehicle based on the list of potential hazards. A recommended path may be a route through the region that limits or otherwise mitigates the passenger's exposure and/or interaction with the list potential hazards. The user management component may determine the recommended path starting from the passenger's current location (e.g., obtained from the user device location data) and leading to the vehicle as the destination location. When determining the recommended path, the user management component may weigh one or more factors, such as which potential hazards are important and/or relevant to the passenger, locations of such potential hazards, seating preference of the passenger (e.g., prefer sitting facing the direction of travel, prefer sitting facing opposite the direction of travel, etc.), passengers currently inside the vehicle, locations of passengers inside the vehicle, future passengers to pick up and/or such future passenger preferences, ranking of the relevant potential hazards, and/or any other factors. In some examples, the user management component may determine the recommended path based on weighing the aforementioned factors.

At operation 1116, the user management component may transmit a message that includes the potential hazard(s) and/or the recommended path to the passenger. The user management component may transmit the message to the passenger via the application on the user device. The message may include at least a portion of the potential hazards identified within the region proximate the pickup location. For instance, in situations in which the region has more than a threshold number of potential hazards, the user management component may select or otherwise determine a number of the highest ranked (e.g., above a threshold number) potential hazards to send to the user device of the passenger. The user management component may also transmit the recommended path to the user device of the passenger. The recommended path may be sent and/or displayed to the user device in various formats, such as by illustrating the recommended path with respect to a map of the region, describing the path through written text, and/or any other format.

EXAMPLE CLAUSES

A: A system comprising: one or more processors; and one or more non-transitory computer-readable media storing computer-executable instructions that, when executed, cause the one or more processors to perform operations comprising: determining that an autonomous vehicle is proximate a pickup location associated with a pickup request of a passenger for the autonomous vehicle; determining that a location of the passenger satisfies a threshold condition; receiving, based at least in part on the location of the passenger satisfying the threshold condition, sensor data from a sensor associated with the autonomous vehicle, the sensor data representing a region proximate the pickup location; determining, based at least in part on the sensor data, a potential hazard associated with the region; determining map data associated with a location of the passenger and the pickup location; determining, based at least in part on the potential hazard and the location of the passenger satisfying the threshold condition, and the map data, a recommended path for the passenger follow to the autonomous vehicle; and transmitting a message, the message including the potential hazard and the recommended path for the passenger.

B: The system of paragraph A, wherein determining the recommended path is based at least in part on: determining a second location of the potential hazard; and identifying, based at least in part on the sensor data and the second location of the potential hazard, a route that leads the passenger through the region.

C: The system of paragraph A, the operations further comprising: determining a second location of the passenger relative to the autonomous vehicle; determining, based at least in part on the sensor data and the second location of the passenger, that there is a line of sight between the passenger and the autonomous vehicle; and causing, based at least in part on the line of sight between the passenger and the autonomous vehicle, the autonomous vehicle to perform at least one of: output, from a speaker associated with the autonomous vehicle, directional audio towards the second location associated with the passenger, or output, from a visual emitter associated with the autonomous vehicle, light towards the second location associated with the passenger.

D: The system of paragraph C, wherein determining the line of sight is based at least in part on: determining, based at least in part on the map data or sensor data, an absence of objects between the passenger and the autonomous vehicle.

E: The system of paragraph A, wherein the potential hazard includes at least one of: an occluded region associated with the pickup location and based on a sensed region of the autonomous vehicle; a first condition of a ground surface; a second condition associated with weather; an object predicted to enter the region associated with the pickup location; audio associated with an emergency vehicle; a first level of traffic in the region; a second level of pedestrian activity in the region; or a presence of an animal within a threshold distance of the pickup location.

F: One or more non-transitory computer-readable media storing instructions executable by one or more processors, wherein the instructions, when executed, cause the one or more processors to perform operations comprising: determining that a vehicle is proximate a pickup location associated with a pickup request of a passenger for the vehicle; determining that a location of the passenger satisfies a threshold condition; receiving sensor data from a sensor device associated with the vehicle, the sensor data representing a region proximate the pickup location; determining, based at least in part on the sensor data, a potential hazard associated with the region; and transmitting a message, the message including information indicative of the potential hazard for the passenger.

G: The one or more non-transitory computer-readable media of paragraph F, the operations further comprising: determining a second location of the passenger relative to the vehicle; determining, based at least in part on the sensor data and the second location of the passenger, that there is a line of sight between the passenger and the vehicle; and causing, based at least in part on the line of sight between the passenger and the vehicle, the vehicle to perform at least one of: output, from a speaker associated with the vehicle, directional audio towards the second location associated with the passenger, or output, from a visual emitter associated with the vehicle, light towards the second location associated with the passenger.

H: The one or more non-transitory computer-readable media of paragraph G, wherein determining the line of sight is based at least in part on: determining map data associated with the second location of the passenger and the pickup location; and determining, based at least in part on the map data or sensor data, an absence of objects between the passenger and the vehicle.

I: The one or more non-transitory computer-readable media of paragraph F, wherein the message is a first message, the operations further comprising: receiving, from a user computing device and based at least in part on transmitting the message, a second message; and causing, based at least in part on the second message, the vehicle to move to a second pickup location.

J: The one or more non-transitory computer-readable media of paragraph F, wherein the potential hazard includes at least one of: an occluded region associated with the pickup location and based on a sensed region of the vehicle; a first condition of a ground surface; a second condition associated with weather; an object predicted to enter the region associated with the pickup location; audio associated with an emergency vehicle; a first level of traffic in the region; a second level of pedestrian activity in the region; or a presence of an animal within a threshold distance of the pickup location.

K: The one or more non-transitory computer-readable media of paragraph F, the operations further comprising: determining, based at least in part on the potential hazard, the sensor data, and map data, a recommended path for the passenger follow to the vehicle; and transmitting the recommended path to the passenger.

L: The one or more non-transitory computer-readable media of paragraph F, the operations further comprising: detecting, based at least in part on the sensor data, a first set of potential hazards within the region; identifying, based at least in part on a passenger profile associated with the passenger, passenger preferences that indicate a second set of potential hazards associated with the passenger; determining, based at least in part the second set of potential hazards, a subset of potential hazards of the first set of potential hazards; and transmitting the subset of potential hazards to the passenger.

M: The one or more non-transitory computer-readable media of paragraph F, the operations further comprising: sending, to a remote system, the sensor data associated with the region; receiving, from the remote system, a list of one or more potential hazards within the region; and transmitting, based at least in part on receiving the list from the remote system, a second message to the passenger, wherein the second message comprises the list of the one or more potential hazards.

N: The one or more non-transitory computer-readable media of paragraph F, wherein the threshold condition comprises at least one of: a first distance between the location and the vehicle meeting or exceeding a second threshold distance, a second distance between the potential hazard and a recommended path being below a third threshold distance, a line of sight between the passenger and the pickup location or the vehicle, or the location of the passenger being within an occluded region.

O: A method comprising: determining that a vehicle is proximate a pickup location associated with a pickup request of a passenger for the vehicle; determining that a location of the passenger satisfies a threshold condition; receiving sensor data from a sensor device associated with the vehicle, the sensor data representing a region proximate the pickup location; determining, based at least in part on the sensor data, a potential hazard associated with the region; and transmitting a message, the message including information indicative of the potential hazard for the passenger.

P: The method of paragraph O, further comprising: determining a second location of the passenger relative to the vehicle; determining, based at least in part on the sensor data and the second location of the passenger, that there is a line of sight between the passenger and the vehicle; and causing, based at least in part on the line of sight between the passenger and the vehicle, the vehicle to perform at least one of: output, from a speaker associated with the vehicle, directional audio towards the second location associated with the passenger, or output, from a visual emitter associated with the vehicle, light towards the second location associated with the passenger.

Q: The method of paragraph P, wherein determining the line of sight is based at least in part on: determining map data associated with the second location of the passenger and the pickup location; and determining, based at least in part on the map data or sensor data, an absence of objects between the passenger and the vehicle.

R: The method of paragraph O, wherein the potential hazard includes at least one of: an occluded region associated with the pickup location and based on a sensed region of the vehicle; a first condition of a ground surface; a second condition associated with weather; an object predicted to enter the region associated with the pickup location; audio associated with an emergency vehicle; a first level of traffic in the region; a second level of pedestrian activity in the region; or a presence of an animal within a threshold distance of the pickup location.

S: The method of paragraph O, further comprising: determining, based at least in part on the potential hazard, the sensor data, and map data, a recommended path for the passenger follow to the vehicle; and transmitting the recommended path to the passenger.

T: The method of paragraph O, wherein the threshold condition comprises at least one of: a first distance between the location and the vehicle meeting or exceeding a second threshold distance, a second distance between the potential hazard and a recommended path being below a third threshold distance, a line of sight between the passenger and the pickup location or the vehicle, or the location of the passenger being within an occluded region.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without passenger input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

determining that an autonomous vehicle is proximate a pickup location associated with a pickup request of a passenger for the autonomous vehicle;

determining that a distance between a current location of the passenger and the autonomous vehicle meets or exceeds a threshold;

determining, based at least in part on the distance between the passenger and the autonomous vehicle meeting or exceeding the threshold, that the passenger is not located at the pickup location;

receiving, in response to determining that the passenger is not located at the pickup location and determining that the autonomous vehicle is located at the pickup location, sensor data from a sensor associated with the autonomous vehicle, the sensor data representing a region proximate the pickup location;

determining, based at least in part on the sensor data and accessing a user profile of the passenger, a potential hazard associated with the region;

determining map data associated with a location of the passenger and the pickup location;

determining, based at least in part on the user profile of the passenger, a ranking of a plurality of potential hazards, wherein the ranking indicates a prioritization of the plurality of potential hazards with respect to the passenger;

determining, based at least in part on the ranking, the potential hazard, the distance meeting or exceeding the threshold, and the map data, a recommended path for the passenger to follow to the autonomous vehicle;

transmitting a message, the message including the potential hazard and the recommended path for the passenger; and controlling the autonomous vehicle based at least in part on transmitting the message.

2. The system of claim 1, wherein determining the recommended path is based at least in part on:

determining a second location of the potential hazard; and identifying, based at least in part on the sensor data and the second location of the potential hazard, a route that leads the passenger through the region.

3. The system of claim 1, the operations further comprising:

determining a second location of the passenger relative to the autonomous vehicle;

determining, based at least in part on the sensor data and the second location of the passenger, that there is a line of sight between the passenger and the autonomous vehicle; and causing, based at least in part on the line of sight between the passenger and the autonomous vehicle, the autonomous vehicle to perform at least one of:

output, from a speaker associated with the autonomous vehicle, directional audio towards the second location associated with the passenger, or output, from a visual emitter associated with the autonomous vehicle, light towards the second location associated with the passenger.

4. The system of claim 3, wherein determining the line of sight is based at least in part on:

determining, based at least in part on the map data or the sensor data, an absence of objects between the passenger and the autonomous vehicle.

5. The system of claim 1, wherein the potential hazard includes at least one of:

an occluded region associated with the pickup location and based on a sensed region of the autonomous vehicle;

a first condition of a ground surface;

a second condition associated with weather;

an object predicted to enter the region associated with the pickup location;

audio associated with an emergency vehicle;

a first level of traffic in the region;

a second level of pedestrian activity in the region; or a presence of an animal within a threshold distance of the pickup location.

6. The system of claim 1, wherein determining the current location of the passenger is based at least in part on:

accessing user device data associated with the passenger; and determining, based at least in part on accessing the user device data of the passenger, the current location of the passenger.

7. The system of claim 1, the operations further comprising:

receiving, from a remote fleet management system, hazard data based on sensor data captured by one or more other vehicles in a fleet, wherein the potential hazard is determined based at least in part on the hazard data from the remote fleet management system.

8. The system of claim 1, wherein the recommended path leads the passenger to a specific side of the autonomous vehicle based at least in part on the potential hazard being within a threshold distance from another side of the autonomous vehicle.

9. The system of claim 1, the operations further comprising:

determining, based at least in part on a seating preference of the passenger obtained from the user profile, the recommended path, wherein the seating preference indicates whether the passenger prefers sitting facing a direction of travel or facing opposite the direction of travel within the autonomous vehicle.

10. One or more non transitory computer readable media storing instructions executable by one or more processors, wherein the instructions, when executed, cause the one or more processors to perform operations comprising:

determining that an autonomous vehicle is proximate a pickup location associated with a pickup request of a passenger for the autonomous vehicle;

determining that a distance between a current location of the passenger and the autonomous vehicle meets or exceeds a threshold;

determining, based at least in part on the distance between the passenger and the autonomous vehicle meeting or exceeding the threshold, that the passenger is not located at the pickup location;

receiving, in response to determining that the passenger is not located at the pickup location and determining that the autonomous vehicle is located at the pickup location, sensor data from a sensor device associated with the autonomous vehicle, the sensor data representing a region proximate the pickup location;

determining, based at least in part on the sensor data and accessing a user profile of the passenger, a potential hazard associated with the region;

determining, based at least in part on the user profile of the passenger, a ranking of a plurality of potential hazards, wherein the ranking indicates a prioritization of the plurality of potential hazards with respect to the passenger;

determining, based at least in part on the ranking, the potential hazard, and the passenger not being located at the pickup location, a recommended path for the passenger to follow to the autonomous vehicle;

transmitting a message, the message including information indicative of the potential hazard and the recommended path for the passenger; and controlling the autonomous vehicle based at least in part on transmitting the message.

11. The one or more non transitory computer readable media of claim 10, the operations further comprising:

determining a second location of the passenger relative to the autonomous vehicle;

determining, based at least in part on the sensor data and the second location of the passenger, that there is a line of sight between the passenger and the autonomous vehicle; and causing, based at least in part on the line of sight between the passenger and the autonomous vehicle, the autonomous vehicle to perform at least one of:

output, from a speaker associated with the autonomous vehicle, directional audio towards the second location associated with the passenger, or output, from a visual emitter associated with the autonomous vehicle, light towards the second location associated with the passenger.

12. The one or more non transitory computer readable media of claim 11, wherein determining the line of sight is based at least in part on:

determining map data associated with the second location of the passenger and the pickup location; and determining, based at least in part on the map data or the sensor data, an absence of objects between the passenger and the autonomous vehicle.

13. The one or more non transitory computer readable media of claim 10, wherein the message is a first message, the operations further comprising:

receiving, from a user computing device and based at least in part on transmitting the message, a second message; and causing, based at least in part on the second message, the autonomous vehicle to move to a second pickup location.

14. The one or more non transitory computer readable media of claim 10, wherein the potential hazard includes at least one of:

an occluded region associated with the pickup location and based on a sensed region of the autonomous vehicle;

a first condition of a ground surface;

a second condition associated with weather;

an object predicted to enter the region associated with the pickup location;

audio associated with an emergency vehicle;

a first level of traffic in the region;

a second level of pedestrian activity in the region; or a presence of an animal within a threshold distance of the pickup location.

15. The one or more non transitory computer readable media of claim 10, the operations further comprising:

detecting, based at least in part on the sensor data, a first set of potential hazards within the region;

identifying, based at least in part on a passenger profile associated with the passenger, passenger preferences that indicate a second set of potential hazards associated with the passenger;

determining, based at least in part the second set of potential hazards, a subset of potential hazards of the first set of potential hazards; and transmitting the subset of potential hazards to the passenger.

16. The one or more non transitory computer readable media of claim 10, the operations further comprising:

sending, to a remote system, the sensor data associated with the region;

receiving, from the remote system, a list of one or more potential hazards within the region; and transmitting, based at least in part on receiving the list of one or more potential hazards from the remote system, a second message to the passenger, wherein the second message comprises the list of one or more potential hazards.

17. A method comprising:

determining that an autonomous vehicle is proximate a pickup location associated with a pickup request of a passenger for the autonomous vehicle;

accessing user device data associated with the passenger;

determining, based at least in part on accessing the user device data of the passenger, that a distance between a current location of the passenger and the autonomous vehicle meets or exceeds a threshold;

determining, based at least in part on the user device data indicating that the distance between the passenger and the autonomous vehicle meeting or exceeding the threshold, that the passenger is not located at the pickup location;

receiving, in response to determining that the passenger is not located at the pickup location and determining that the autonomous vehicle is located at the pickup location, sensor data from a sensor device associated with the autonomous vehicle, the sensor data representing a region proximate the pickup location;

determining, based at least in part on the sensor data and accessing a user profile of the passenger, a potential hazard associated with the region;

determining, based at least in part on the user profile of the passenger, a ranking of a plurality of potential hazards, wherein the ranking indicates a prioritization of the plurality of potential hazards with respect to the passenger;

determining, based at least in part on the ranking, the potential hazard, and the passenger not being located at the pickup location, a recommended path for the passenger to follow to the autonomous vehicle;

transmitting a message, the message including information indicative of the potential hazard and the recommended path for the passenger; and controlling the autonomous vehicle based at least in part on transmitting the message.

18. The method of claim 17, further comprising:

determining a second location of the passenger relative to the autonomous vehicle;

determining, based at least in part on the sensor data and the second location of the passenger, that there is a line of sight between the passenger and the autonomous vehicle; and causing, based at least in part on the line of sight between the passenger and the autonomous vehicle, the autonomous vehicle to perform at least one of:

output, from a speaker associated with the autonomous vehicle, directional audio towards the second location associated with the passenger, or output, from a visual emitter associated with the autonomous vehicle, light towards the second location associated with the passenger.

19. The method of claim 18, wherein determining the line of sight is based at least in part on:

determining map data associated with the second location of the passenger and the pickup location; and determining, based at least in part on the map data or the sensor data, an absence of objects between the passenger and the autonomous vehicle.

20. The method of claim 17, wherein the potential hazard includes at least one of:

an occluded region associated with the pickup location and based on a sensed region of the autonomous vehicle;

a first condition of a ground surface;

a second condition associated with weather;

an object predicted to enter the region associated with the pickup location;

audio associated with an emergency vehicle;

a first level of traffic in the region;

a second level of pedestrian activity in the region; or a presence of an animal within a threshold distance of the pickup location.

* * * * *